[19] Lake, Jr. et al.

[11] Patent Number: 4,698,666
[45] Date of Patent: Oct. 6, 1987

[54] VIDEO KEY GLOW AND BORDER GENERATOR

[75] Inventors: David E. Lake, Jr., Penn Valley; Robert L. Miller, Davis, both of Calif.

[73] Assignee: The Grass Valley Group, Inc., Grass Valley, Calif.

[21] Appl. No.: 754,487

[22] Filed: Jul. 12, 1985

[51] Int. Cl.⁴ .............................................. H04N 9/74
[52] U.S. Cl. ...................................... 358/22; 350/183; 340/730
[58] Field of Search ............... 358/21 R, 22, 182, 183, 358/160; 340/730, 791

[56] References Cited

U.S. PATENT DOCUMENTS 4,408,198 10/1983 Kudirka ............................ 340/730
4,533,937 8/1985 Yamamoto ........................ 358/22
4,620,228 10/1986 Mikado ............................. 358/22
4,621,280 11/1986 Shinohara ........................ 358/22

Primary Examiner—Michael A. Masinick
Attorney, Agent, or Firm—Francis I. Gray; Allston L. Jones

[57] ABSTRACT

A method and apparatus is disclosed which provides for the placement of a border video signal around a selected object in a video image. A video image of the selected object is first inserted into a video image of a selected border video signal in a video mixing process by use of a key signal defining the selected object. The key signal is further processed to transform the step transitions associated therewith between the zero and full insert states into non-step transitions. The transformed key signal is thereafter used to control a subsequent mixing of the resulting image of the selected object inserted into the video image of the border video signal with a background image to produce a composite video image.

30 Claims, 35 Drawing Figures

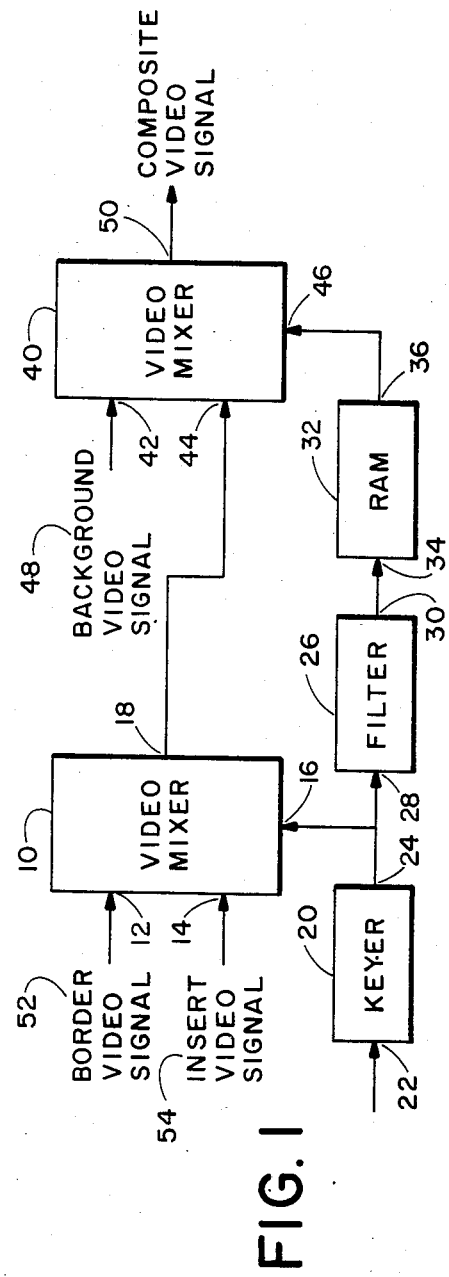
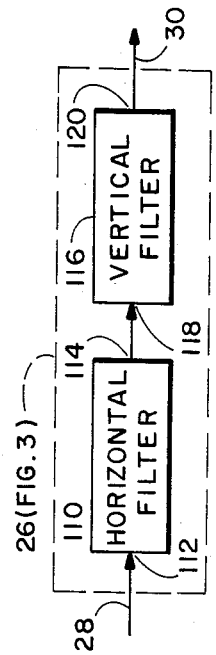

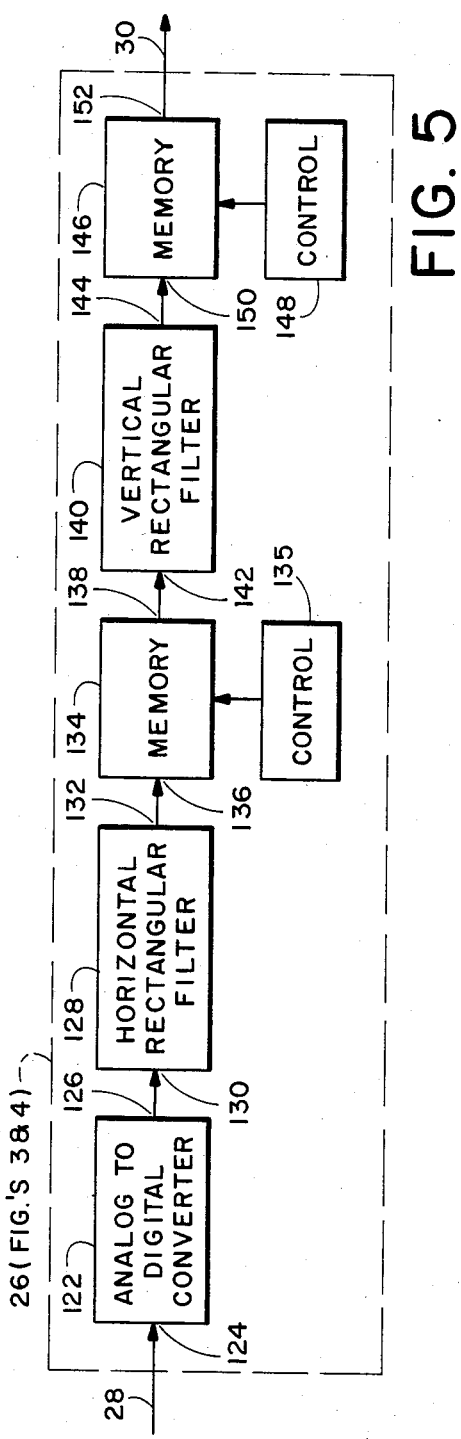
FIG. 5
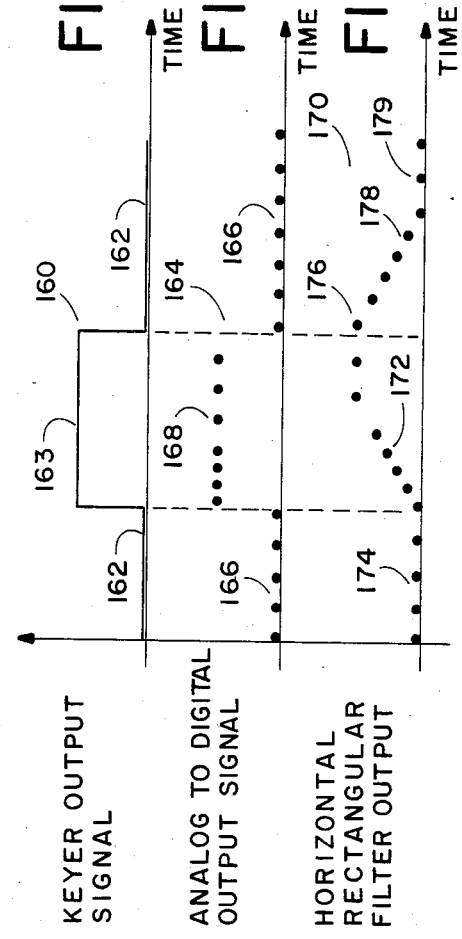
FIG. 6A
FIG. 6B
FIG. 6C

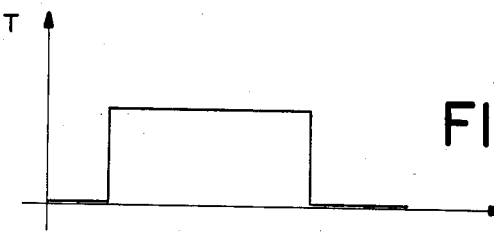

VIDEO KEY GLOW AND BORDER GENERATOR

BACKGROUND

This invention relates to television special effects, and more particularly to a method and apparatus for producing a border having selected characteristics around a selected object on a video image.

It is frequently desirable in dealing with visual images to obtain an image having particular characteristics. If an appropriate scene is available, then an image may be directly captured on appropriate media, such as film or video tape, for subsequent use. However, it is often the case that a desired image is not directly available, and must consequently be created. In such a case, the desired image may be indirectly produced through the use of special techniques, broadly referred to as special effects. In such a process, a desired visual image may be artificially created through the combination of visual information from various sources. The manner in which the visual information from the various sources is combined is determined by the desired effect, there being many ways and techniques in which visual information may be combined. Consequently, desired visual images which are themselves not directly available may often be indirectly produced through the use of a variety of special effects. Such techniques operate to extend the horizon of visual images available for use in various applications. Such techniques typically find great demand in the fields of entertainment and commercial product or service advertisement. There is consequently a large interest in the field of special effects.

A special effect of particular interest is that of producing a glow around a selected object. Broadly speaking, a glow is a fringe of light surrounding an object, the intensity of which decreases with distance from the object. A further property of glow is that the background image over which the glow is superimposed may be seen through the glow. In the past, this has been accomplished in a number of different ways.

One method employed to produce a glow around an object involves the use of animation techniques. In particular, the object around which a glow is desired is first photographed on an appropriate media. Thereafter, positional information with respect to the location and shape of the desired glow is determined. Next, appropriate art work is prepared according to the desired glow. In particular, the general shape, width, amount of glow, color and other associated parameters are determined and used to construct the appropriate art work. Thereafter, the art work is photographed. The resulting photograph is then combined with the original visual information in a mixing process appropriate for the media in use. The resulting visual image will consequently be the original image with the desired glow there around.

While the use of animation techniques does provide for a wide variety of special effects, it is apparent that the process necessarily involved in the production of the desired glow is somewhat labor intensive and time consuming. In addition, the nature of the process does not provide for ease in varying of the parameters associated with the glow. To the contrary, the changing of a parameter would generally require the repetition of the complete process. Consequently such a process necessarily is not only somewhat tedious and expensive, but also inflexible.

An alternate approach to the process of producing a glow around a selected object involves the use of a defocused image. Broadly stated, two images of the object around which the glow is desired are used. One of the images, however, is created by defocusing the associated camera by a selected amount. The image produced by the defocused camera is consequently not sharp, but blurred in accordance with the amount of defocusing employed. The image from the properly focused camera is then superimposed over the image from the defocused camera; the image from the defocused camera thereby producing the appearance of a glow around the selected object. Implementation of the foregoing described defocused image technique could be achieved in the film media in various ways. One such way would employ two separate cameras to obtain the two images. However, such an approach presents a problem of correct registration of the resulting images, as different perspectives result from the differing positions of the two cameras. A second approach employing the use of film media employs a single camera, and a subsequent double exposure process. However, such a technique necessarily involves a certain amount of trial and error. An alternate approach employing video media includes the technique of using a single video camera. A first image is obtained of the desired object with the video camera defocused by a selected amount. The defocused image is thereafter stored. The mechanism employed to store the defocused image could be any of a wide variety of storage devices, including a video tape recorder, or devices capable of storing a frame of video information, commonly referred to a frame store. A second video image of the desired image, correctly focused, is thereafter obtained. The two video images are then mixed in a video mixer. Associated parameters such color characteristics of the glow could be obtained by a wide variety of techniques, including the use of optical filters on the defocused camera, or the electronic generation of the desired color.

However, notwithstanding the choice of media, several shortcomings are apparent. First, the amount of control over the glow is dependent upon the optical characteristics of the lense employed. Consequently control over such parameters as width and intensity of the glow are somewhat indirect. In addition, a somewhat tedious alignment process may also be necessary to ensure proper registration of the focused image over the defocused image. Furthermore, the color desired for a glow is not necessarily easily changeable, depending upon the media in which the glow effect is produced. In further addition to the foregoing, and of perhaps more significance is the fact that none of the foregoing methods of producing a glow around a selected object provide for the production thereof in a real time environment. In particular, with each of the foregoing, it is necessary to perform varying amounts of work to achieve a glow around a selected object. If the object should thereafter be displaced in position, the glow would not follow the displacement of the object. Consequently, it is not possible to create a glow in a real time environment in such a manner that the glow would follow displacement of the object around which the glow is created.

It is consequently apparent from the foregoing that the production of a glow around a desired object is a somewhat indirect process having significant shortcomings.

SUMMARY

In accordance with the present invention, a method and apparatus are disclosed which provide for the production of a composite video signal comprised of a background image having an insert image placed therein with a further video image placed around the insert image. By way of illustration, a background image comprised of a rural scene may have an insert image placed therein comprised of the numeral "1", surrounded by a selected color. The width and intensity variations of the video signal which is placed about the insert image may be varied as desired. In further addition, while the shape of the insert image may be defined by the shape of the selected insert image, e.g., the numeral "1", alternate video information may be substituted for the insert video image. Again by way of illustration, a background video signal comprised of a rural scene may have an insert image placed therein, e.g., a numeral "1", with a glow therearound, and the video information occuring within the area of the numeral "1", may be an urban scene. In a similar fashion, the video image placed around the insert image is not limited to a single color, but may be any selected video signal, e.g., a video image comprised of a rainbow of colors.

Broadly stated, a variable width border comprised of a first selected video signal, hereinafter referred to as the border video signal, is placed around a second video signal, hereinafter referred to as the insert video signal, over a third video signal, hereinafter referred to as the background video signal. The resulting video signal having the insert video signal with the border video signal placed therearound over the background video signal will hereinafter be referred to as the composite video signal. While the border video signal may be of either constant or positionally varying intensity, by selecting a positionally varying intensity a glow effect may be obtained. In one particular application, by selecting the border video signal to be of a constant color, and varying the intensity thereof in a selected manner, the resulting composite video image will be comprised of the insert video signal placed over the background video signal with a glow appearing therearound having a color determined by the border video signal.

Broadly speaking, the desired composite video signal is achieved by first defining the shape of the desired insert image, hereinafter referred to as the insert image, contained within the insert video signal about which the border video signal is desired to be placed around. This is accomplished using a video keyer, such as a luminance or chroma keyer, employing standard video keying techniques. The keyer produces a key signal which defines a silhouette of the desired insert image. This key signal is used to surround the insert image with the border video image, and is performed in a typical video mix amplifier, hereinafter referred to as a first video mix amplifier. The output of the first video mix amplifier is consequently a video image comprised of the insert video signal having the border video signal placed therearound. The key signal which defines the shape of the insert image is then split into two paths. One path is simply delayed to provide for an output signal which is identical to the input signal thereto, only delayed by a fixed amount of time. The delay is necessary to ensure that in a subsequent process, the two signals combined will have each been subjected to an equivalent delay period, as will be more fully described hereinafter. The second path of the key signal is optionally passed through a key widener which functions to expand the silhouette symmetrically in the horizontal and vertical directions by a selected distance. The key signal is then filtered by a two dimensional digital filter. The filtering operation converts the step shaped silhouette edges present in the key signal to a selected shape that extend outside of the original silhouette in both the horizontal and vertical dimensions. The filtered key signal is thereafter coupled to a RAM look up table which broadly functions as a gain/attenuator/clipper stage. This processed key signal is then combined with the delayed version of the original key signal in a such a manner to insure that within the boundaries of the selected object the processed key signal does not attenuate the insert image. The background video image is then combined with the output of the first video mixer, i.e., the image contained within the insert video signal with the border video signal therearound, in a second video mix amplifier according to the above described combined key signal to produce the composite video signal. The sloping edges of the key signal operate to adjust the relative intensities of the border video signal versus the background video signal in the composite video signal produced by the second video mixer. This has the effect of tappering the intensity of the surrounding border video signal into the background video signal. In the particular case wherein the border video signal is selected to be a single color, the composite video signal will be comprised of the insert image contained within the insert video signal, placed over the background video signal with a glow therearound. The color characteristics of the resulting glow are determined by the color characteristics of the border video signal.

DESCRIPTION OF THE FIGURES

FIG. 1 illustrates a broad functional block diagram of apparatus incorporating the present invention.

FIG. 4 illustrates two separate filter operations used to implement a filter of FIG. 3.

FIG. 5 illustrates a more detailed implementation of the filter of FIG. 3.

FIGS. 6A-6C illustrate waveforms associated with the operation of the apparatus of FIG. 5.

FIGS. 12A-12E illustrate waveforms associated with the operation of the apparatus of FIG. 11.

DETAILED DESCRIPTION

Figure 2A:
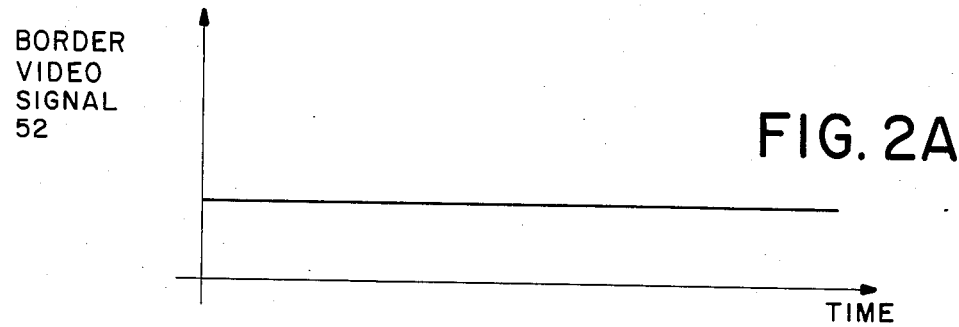
FIGS. 2A-2G illustrate waveforms associated with the operation of the apparatus of FIG. 1.

According to the apparatus and method of the present invention, a border video signal may be placed around an arbitrary shape in a video image in the following manner. A silhouette of the insert image is first isolated by standard keying techniques, such as a chroma or luminance keyer. The key signal so obtained functions to define the spatial extent of the insert image, and is traditionally used to control the inserting of the insert image over a background image. However, by properly manipulating the key signal and insert image, as will be more fully discussed hereinafter, a border video signal can be placed around the insert image against a background video signal. The border video signal is obtained by first inserting the insert image into the border video signal through the use of a typical video mixer using standard keying techniques. Consequently, the output of the video mixer will be the original insert image surrounded by the border video signal. However, the key signal is further processed. Broadly speaking, key signals have a first state, generally referred to as a zero insert state, which corresponds to that area of a composite image which is the background image, and a second state, generally referred to as a full insert state, which corresponds to that area of a composite image which is the insert image. In addition to the zero and full insert states, intermediate states therebetween define corresponding states wherein the background and insert image are combined in varying proportions. According to the present invention, the key signal is filtered to produce a signal having gradual rather than sharp transitions between the zero and full insert states. In the preferred embodiment, the desired filtering is performed through the use of a finite impulse response rectangular digital filter. The key signal is thereafter further processed to provide for further shaping of the transition slopes, as will be more fully discussed hereinafter, and thereafter used to control the mixing between two images in a second video mixer. A second video mixer has the desired background image coupled to a first input thereto, and the output from the first video mixer, i.e., the insert video image surrounded by the border video signal, coupled to the second input thereto. The output of the second video mixer responsive to the key signal with sloping transitions supplied thereto will consequently be the insert image surrounded by the border video signal inserted over the background video signal.

FIG. 1 broadly illustrates the method and apparatus of placing a border video signal around a desired insert image according to the present invention. Referring to FIG. 1, Video Mixer 10 has a first input terminal 12, a second input terminal 14, an input key signal terminal 16, and an output terminal 18. Video Mixer 10 functions responsive to the video mixer input key signal on terminal 16 to couple either of the first or second input signals to output terminal 18. In particular, assuming that video mixer input key signal is binary in nature, i.e. comprises a signal which can exist in one of two possible states, then Video Mixer 10 would couple the first input signal, i.e., border video signal 52, to the output terminal 18 responsive to the input key signal on terminal 16 being in a first state, and would couple the second input signal, i.e., insert video signal 54, to output terminal 18 responsive to an input key signal on terminal 16 being in the second state. Video Mixer 10 may be any of a wide variety of video mixers, such as the Model 300 Switcher manufactured by The Grass Valley Group of Grass Valley, Calif., and more particularly the Model 308 Video Mixer as described in The Grass Valley Group Data Packet A90-065308-02, which Data Packet is hereby incorporated by reference. Keyer 20, responsive to an input signal on terminal 22, functions to produce a keyer output signal on terminal 24. Broadly stated, the keyer output signal functions to define the shape of a selected object contained in the keyer input signal. Keyer 20 may produce a binary signal representative of the silhouette of the object contained in the keyer input signal according to one of several comparison criteria. One such comparison criteria is based upon comparing relative levels of brightness or luminance present in the keyer input signal on terminal 22. In such a criteria, Keyer 20 operates to continuously compare the brightness, or luminance, level of keyer input signal, producing the keyer output signal in response to a level of brightness or luminance present in keyer input signal exceeding a pre-defined level. Typical of such a luminance keyer is the Model 350 Key Processor manufactured by The Grass Valley Group, and more particularly described in The Grass Valley Group Data Packet A90-065350-01, which Data Packet is hereby incorporated by reference. In a similar fashion, Keyer 20 may compare colors, or chrominance, present in the signal coupled to keyer input terminal 22. Typical of such is the chroma keyer manufactured by The Grass Valley Group, and in particular the Decoder Model 355 and Chroma Keyer Module Model 357 as more fully described in The Grass Valley Group Data Packets A90-065355-00 and A90-065357-00, respectively, which Data Packets are hereby incorporated by reference. In this regard it is understood that the desired insert silhouette contained in the signal coupled to keyer input terminal 22 is placed against a background selected to provide a contrast based upon the selection criteria of Keyer 20. Filter 26 functions to convert a binary filter input signal on terminal 28, i.e., one having two possible values, into a filter output signal at terminal 30, having controlled ramping edges that extend outside of the original object silhouette defined by the transitions between states in the original key signal. In the preferred embodiment, Filter 26 is implemented by a finite impulse response rectangular digital filter, as will be more fully discussed hereinafter. Random Access Memory 32, hereinafter referred to as RAM 32, functions as a look up table to implement the functions of a gain/attentuator/clipper stage, as will be more fully discussed hereinafter. In particular, RAM 32, responsive to an input signal on terminal 34 produces an output signal on terminal 36 according to information previously stored in RAM 32. Video Mixer 40 receives a first input signal at terminal 42, a second input signal at terminal 44, an input key signal at terminal 46, and produces an output signal, hereinafter referred to as a composite signal, on terminal 50. Video mixer 40 is similar to Video Mixer 10, and operates in a similar manner.

The foregoing described apparatus is configured in the following manner. Border video signal 52 is coupled to the first input terminal 12 of Video Mixer 10, and functions to provide a background signal against which an insert video signal 54 will be inserted by Video Mixer 10, as will be more fully discussed hereinafter. The color characteristics of border video signal 52 determines the color characteristics of the resulting border placed around the insert image, as previously discussed. The insert video signal 54 contains the insert image around which the border video signal is desired, and is coupled to the second input terminal 14 of Video Mixer 10. The signal coupled to keyer input terminal 22 contains the shape of the desired insert image against a background of suitable contrast and is coupled to input terminal 22 of Keyer 20. The output signal, produced by Keyer 20 on terminal 24, is coupled to the input key signal terminal 16 of Video Mixer 10 and to input signal terminal 28 of Filter 26. Output signal terminal 30 of Filter 26 is coupled to input terminal 34 of RAM 32. The output terminal 36 from RAM 32 is coupled to the input key terminal 46 of Video Mixer 40. The output signal on terminal 18 of Video Mixer 10 is coupled to second input terminal 44 of Video Mixer 40. The background video signal 48 represents the video image over which the insert video image with the associated border there around is to be placed. Background video signal 48 is coupled to first input terminal 42 of Video Mixer 40.

Figure 2B:
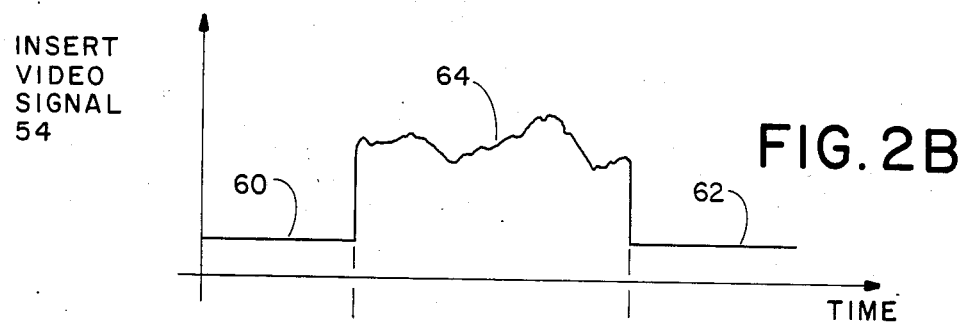
Figure 2C:
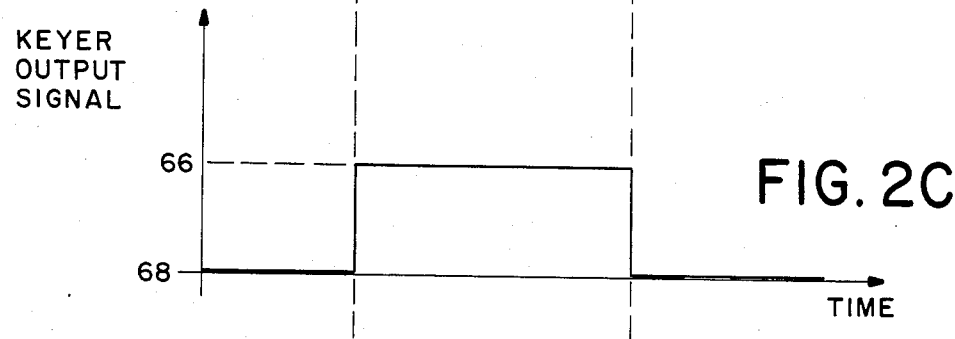
Figure 2D:
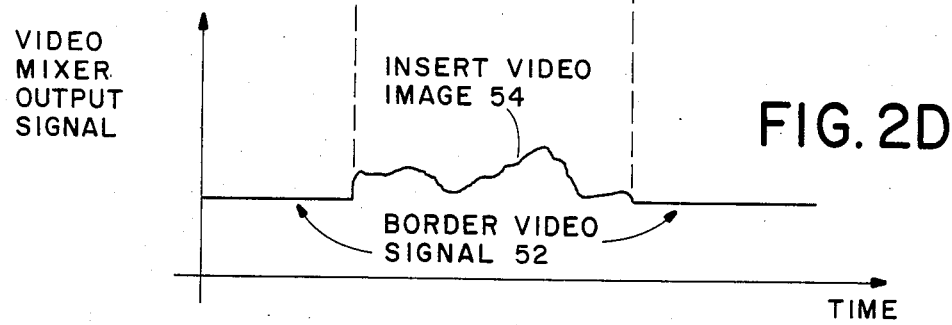
Figure 2C:
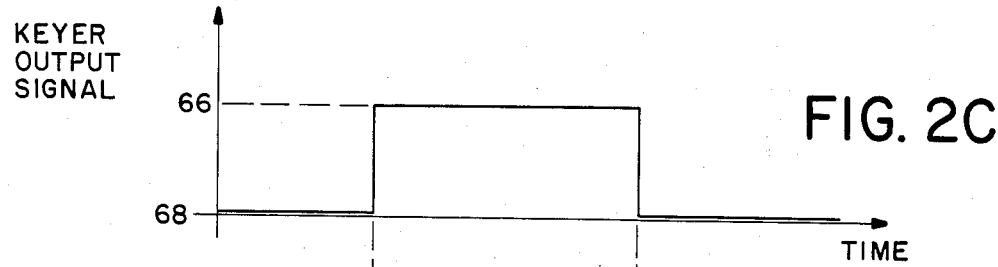
Figure 2E:
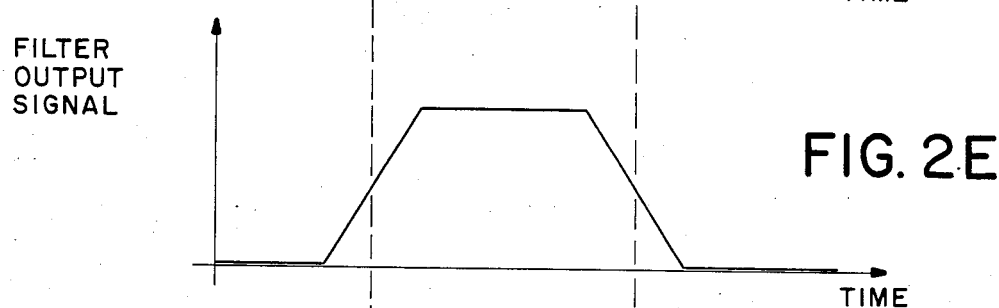
Figure 2F:
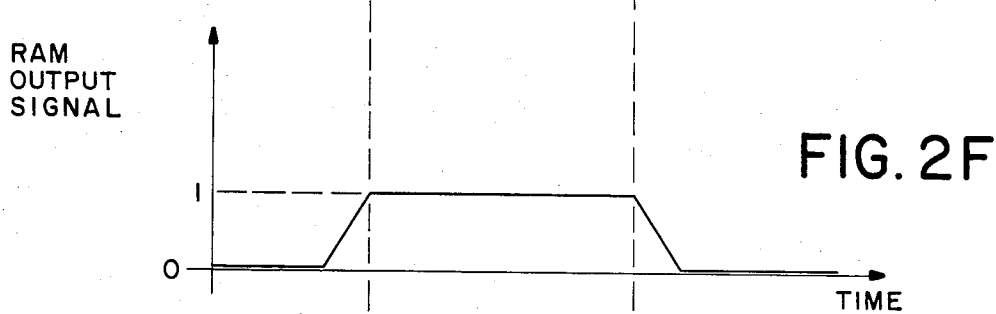
Figure 2G:
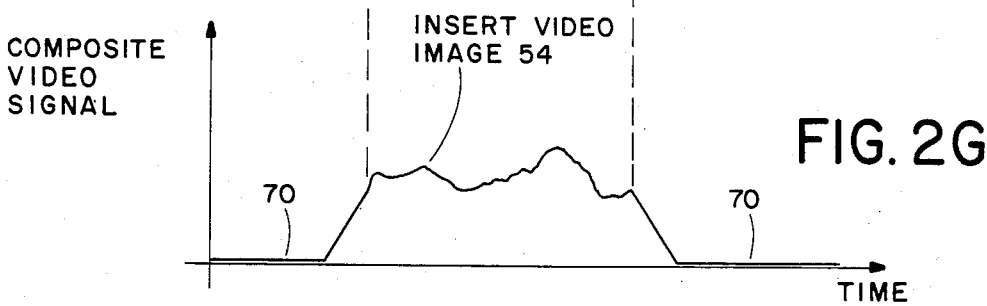

The operation of the foregoing described apparatus of FIG. 1 may be more fully understood by considering the waveforms produced by the foregoing described apparatus as generally illustrated in FIGS. 2A through 2G. FIG. 2A illustrates a video signal for a single scan line in border video signal 52. For the purposes of the present discussion, border video signal 52 is assumed to be a selected color. As border video signal 52 is a selected color and consequently a constant value, the corresponding intensity level is likewise constant. FIG. 2B illustrates a video signal for a single scan line in insert video image 54. It will be observed with respect to FIG. 2B, that segments 60 and 62 correspond to the background against which the insert image appears as it is exposed to the associated video camera. For the purposes of the present discussion, the same signal which is applied to video mixer input terminal 14 will be assumed to be coupled to keyer input terminal 22. Consequently, while segment 64 corresponds to video intensity information across the insert object, FIG. 2C illustrates the output signal of Keyer 20 (FIG. 1) in response thereto. It will be observed that the keyer output signal is in a first state 66 for the duration of the scan across the insert object, and in a second state 68 for the duration of the scan across the background against which the insert object was placed. FIG. 2D illustrates the output signal from Video Mixer 10 (FIG. 1) responsive to border video signal 52, insert video signal 54 and the keyer output signal, as indicated in FIS. 2A, 2B and 2C. It will be observed that the video mixer output signal corresponds to the border video signal 52 during the time periods the keyer output signal is at the second state 68, and corresponds to insert video signal 54 during the time periods the keyer output signal is at the first state 66. FIG. 2E illustrates the filter output signal from from Filter 26. For the purposes of reference, FIG. 2C, Keyer Output Signal, is repeated directly above FIGS. 2E, 2F and 2G. It will be observed that the filter output signal generally corresponds to the keyer output signal (FIG. 2C), with the step transitions associated therewith altered to linear transitions. FIG. 2F illustrates the RAM output signal. In this regard, it is understood that as RAM 32 operates as a gain/limiter/clipper stage, the precise shape of the RAM output signal in response to filter output signal will be determined by the information stored therein. Broadly stated, the attenuation of the ramped key signal adjusts the intensity of the border/background mix surrounding the insert object, as will be more fully discussed hereinafter. RAM 32 may be further used in shaping the filter output signal, as will be more fully discussed hereinafter. FIG. 2G illustrates composite video signal 51 from Video Mixer 40 in response to a background video signal 48 of a black level, and the foregoing described video mixer output signal from Video Mixer 10, and RAM output signal coupled to video mixer input key signal of Video Mixer 40. In particular, it will be observed with respect to FIG. 2G that the black level is present in portions indicated generally as 70, i.e., where the RAM output signal has a zero value. For the linear changing portions of the RAM output, Video Mixer 40 performs a mix between the background video signal 48 and the border video signal surrounding the insert image contained in the output signal from Video Mixer 10. Broadly speaking, the production of composite video signal 51 by Video Mixer 40 is performed according to $$\text{Composite Video Signal} = zA + (1-z)B \tag{1}$$

where A and B represent the two input signals coupled to terminals 44 and 42 of Video Mixer 40, respectively. z may assume values between zero and one, and determines the respective amounts of signals A and B which are present in the composite video signal. By inspection of the foregoing equation, it is apparent that a value of zero for z results in composite video signal 51 being comprised entirely of the signal coupled to terminal 42 of Video Mixer 40 i.e., the background image signal 48. In a similar fashion, a value of one for z results in composite video signal 51 being composed entirely of the signal coupled to terminal 44 of Video Mixer 40 i.e., the insert image inserted over the border video signal, as represented by the video mixer output signal from terminal 18 of Video Mixer 10. For values of z between zero and one, composite video signal 51 will be comprised of a mixture of the signal from terminal 18 of Video Mixer 10 and background video signal 48. The value of z is determined by the RAM output signal. Consequently, it is observed that as the RAM otput signal varies between the corresponding values of zero and one the composition of the composite signal varies between being comprised entirely of the background video signal and the signal from Video Mixer 10. As the signal from Video Mixer 10 is comprised of the insert image inserted over the border video signal, with the key signal which controls the insertion thereof being used to produce the RAM output signal, with linearly increasing values occurring prior to the occurrence of the insert image, a scan line the of composite signal from Video Mixer 40 will consequently be comprised of background video signal 48 followed by an increasing mix of the signal from Video Mixer 10. However, during the period in which the signal from Video Mixer 10 is being mixed with background video signal 48, the signal from Video Mixer 10 contains border video signal 52. Consequently, the amount of border video signal 52 will linearly increase in the composite video signal corresponding to the linear increase of the RAM output signal. Thereafter, when the signal from Video Mixer 10 switches from border video signal 52 to insert video signal 54, the RAM output signal will change to the value of one. Consequently, the composite video signal will be comprised of insert video signal 54. In a similar fashion when the RAM output signal begins to decrease, the signal from Video Mixer 10 will have changed from insert video signal 54 back to border video signal 52. Consequently, the linearly decreasing RAM output signal will result in decreasing amounts of the video mixer output signal, i.e. border video signal 52, being present in composite video signal 51, and increasing amounts of background image signal 48 being present in the composite signal. When the RAM output signal reaches the value of zero, composite video signal 51 from Video Mixer 40 will be comprised entirely of background video signal 48. The resulting video image will be one which changes from background image to the insert video image, with the transition there between being occupied by the border video signal. Consequently, in the resulting video image, i.e., composite video signal 51, the insert video signal will appear inserted over the background image, with a border there around as determined by the color characteristics of the border video signal, and the level of intensity determined by the type of transition associated with the RAM output signal.

From the foregoing it is understood that the described method and apparatus may be operated in several different ways. By way of illustration, if insert video signal 54 is coupled to both terminal 14 of Video Mixer 10 and to terminal 22 of Keyer 20, then the image defined by the key signal will correspond to the inserted video image. However, if a separate video signal is coupled to keyer input terminal 22, then the image contained within the video signal coupled to keyer input terminal 22 will define the shape of the insert image, with the video information coupled to video mixer input terminal 14 defining the actual video content of the information which is placed into the area defined by the key signal produced by Keyer 20. Again by way of illustration, if the output from a character generator were coupled to keyer input terminal 22, then the output signal from Keyer 20 would define the respective shapes of the characters. However, the video information which would appear within each of the characters defined by the output signal from Keyer 20 would be determined by the signal coupled to terminal 14 of Video Mixer 10, i.e., insert video signal 54. It is consequently observed that a border defined by border video signal 52 may be placed around an image the perimeter of which is defined by the signal coupled to keyer input termial 22, and the content of which is defined by the signal coupled to video mixer input terminal 14, i.e., insert video signal 54.

It is to be understood that FIG. 1 illustrates the broad functional operation of the apparatus of the present invention. It is to be further understood that the broad functional operational characteristics discussed with respect to FIG. 1 could be implemented in a wide variety of ways using either exclusively analog or digital techniques, or a combination of both analog and digital techniques, as would be apparent to one of ordinary skill in the art. In the preferred embodiment, Video Mixers 10 and 40 and Keyer 20 were implemented using analog techniques; all other elements were implemented employing digital techniques, as will be more fully discussed hereinafter.

Figure 3:
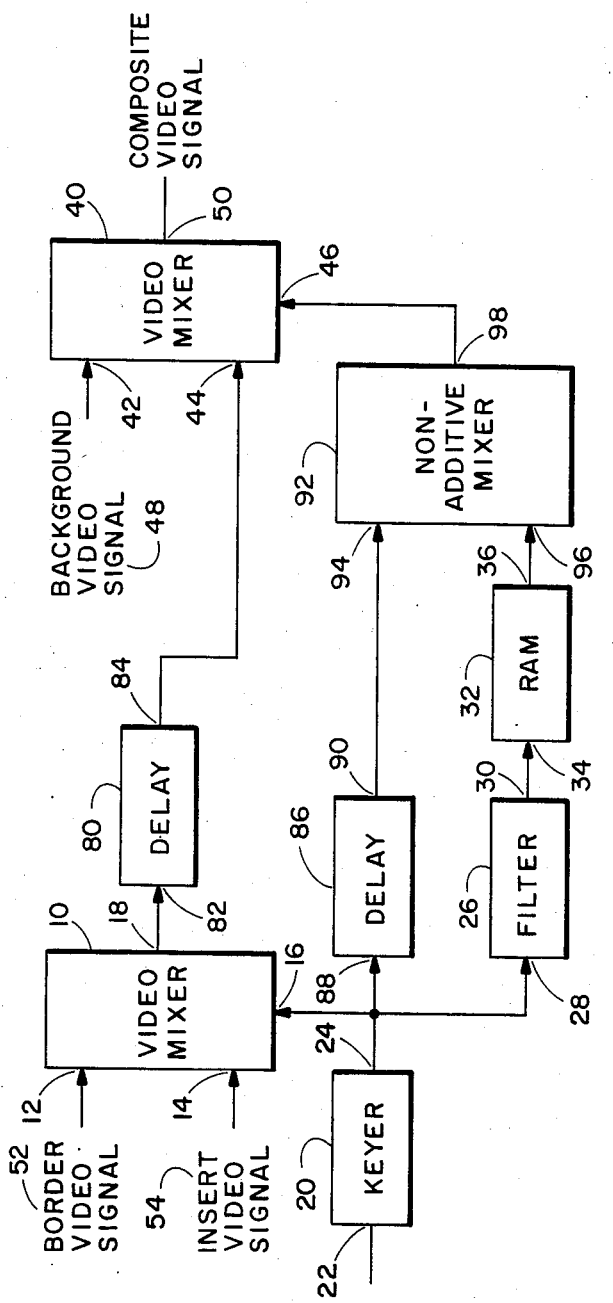
FIG. 3 illustrates a functional block diagram of the preferred embodiment of the present invention.

While the foregoing has been a broad description of the apparatus and method of the present invention, FIG. 3 illustrates the preferred embodiment in a block diagram format. FIG. 3 is similar to FIG. 1, having the additional elements of Delay 80, Delay 86 and Non-additive Mixer 92. FIG. 3 is similar to FIG. 1, and like elements have been given corresponding reference designators. Referrring to FIG. 3, Delay 80 has associated therewith input terminal 82 and output terminal 84. Delay 80 is responsive to a video signal coupled to input terminal 82, and functions to produce a video signal identical thereto at output terminal 84, delayed in time by a predetermined period. The functions of Delay 80 may be implemented in any of a wide variety of ways, as would be apparent to one of ordinary skill in the art, including the use of a Model 110-S Synchronizer, manufactured by Tektronix Inc. of Beaverton, Oreg. Delay 86 is similar to Delay 80, and has associated therewith input terminal 88 and output terminal 90. Delay 86 is responsive to a key signal coupled to input terminal 88, and functions to produce a key signal identical thereto at output terminal 90, delayed in time by a predetermined period. The functions of Delay 86 may likewise be implemented in a wide variety of ways, as would be apparent to one of ordinary skill in the art, including the use of the Model 100-S Synchronizer, previously referenced. Non-Additive Mixer 92 has associated therewith first input terminal 94 and second input terminal 96, as well as output terminal 98. Non-Additive Mixer 92 functions to couple the larger of the signal present on either first input terminal 94 or second input terminal 96 to output terminal 98, to ensure that the insert image is fully inserted over the background image, as will be more fully discussed hereinafter. The functions of Non-Additive Mixer 92 may be implemented in a wide variety of ways well known in the art. In the preferred embodiment, as Video Mixer 40 is implemented using analog techniques, and Non-Additive Mixer 92 is implemented using digital techniques, non-additive mixer output 98 must be converted from a digital format to an analog format. In the preferred embodiment a Model TDC 1016 Digital-to-Analog Converter manufactured by TRW of La Jolla, Calif. is employed. The apparatus of FIG. 3 is configured in a similar manner as the apparatus of FIG. 1, with the following modifications to accommodate Delay 80, Delay 86 and Non-additive Mixer 92. The output signal from Video Mixer 10 is coupled to input terminal 82 of Delay 80, rather than directly to first input terminal 42 of Video Mixer 40, as configured in FIG. 1. The output signal from Delay 80 is coupled to input terminal 42 of Video Mixer 40. Keyer output terminal 24 is further coupled to input terminal 88 of Delay 86. Output terminal 90 from Delay 86 is coupled to first input terminal 94 of Non-Additive Mixer 92. The RAM output signal is coupled to Non-Additive mixer second input terminal 96, rather than directly to video mixer input key terminal 46, as configured in FIG. 1. Non-additive mixer output terminal 98 is coupled to video mixer input key terminal 46.

The operation of the apparatus of FIG. 3 is similar to the operation of the apparatus of FIG. 1, with the additional functions of Delay 80, Delay 86 and Non-additive Mixer 92. Delay 80 functions to provide a delay for the signal from terminal 18 of Video Mixer 10 so that the signal from terminal 84 of Delay 80 when coupled to video mixer first input terminal 42 will be delayed in time by a period equal to the corresponding delay of the key signal supplied to video mixer input key terminal 46, which key signal has been delayed by the processing introduced by the combined operations of Delay 86, Filter 26, RAM 32 and Non-Additive Mixer 92. Delay 86 functions in a similar fashion to Delay 80, and provides for the delay of the key signal produced by Keyer 20 equal to the delay introduced by the processing on said key signal by Filter 26 and RAM 32, so that the signals coupled to non-additive mixer first input terminal 94 and non-additive mixer second input terminal 96 are delayed by an equal period of time. Broadly stated, Non-Additive Mixer 92 functions to ensure that insert video signal signal 54 is fully inserted into background video signal 48, and in particular, that the background video image does not appear within the insert video image silhouette. The foregoing is accomplished in the following manner. The output signal from Delay 86 is the delayed version of the key signal produced by Keyer 20, and is binary in form. In particular, the binary states of the signal at Delay output terminal 90 define the points at which the insert video image begin and end. The RAM output signal from RAM 32 is a processed key signal with linearly sloping edges. Non-Additive Mixer 92 consequently will couple to non-additive mixer output terminal 98 the RAM output signal from RAM 32 during the times when the output signal from delay 86 is in the zero state. Consequently, the video mixer input key signal on terminal 46 of Video Mixer 40 will follow the linearly rising or falling edges of the key signal produced by Filter 26 and RAM 32. However, when the output signal from Delay 86 changes to the full insert state, Non-Additive mixer 92 will then couple the full insert state to non-additive mixer output terminal 98, which when coupled to video mixer key signal input terminal 46 will result in Video Mixer 40 coupling the video mixer output signal from Video Mixer 10 delayed by Delay 80 to the output of Video Mixer 40, i.e., insert video signal 54 will be fully coupled to the composite signal.

Turning now to the implementation of Filter 26, it will be recognized that the foregoing broad description of the operation of Filter 26 was, for the purpose of simplicity, limited to the horizontal dimension. It will be recognized that similar filtering is also necessary in the vertical dimension. In particular, as the step transitions of the key signal were transformed into generally sloping transitions with respect to the horizontal dimension, the corresponding transitions of the key signal must be likewise performed with respect to the vertical dimension. By way of illustration of the foregoing requirement, if the transformation of the key signal were only performed in the horizontal dimension, the resulting signal would have the corresponding glow there around only along vertical edges thereof, and the transitions around the horizontal edges would correspond to the step transitions of the original key signal. Consequently, the aforedescribed filtering must be performed in both the horizontal and vertical dimensions. According to the method and apparatus of the present invention, the necessary horizontal and vertical filtering is accomplished in a two step process. Broadly speaking, filtering in one dimension is first performed, with filtering in the second dimension being performed thereafter. FIG. 4 broadly illustrates the two step process. Referring to FIG. 4, Horizontal Filter 110 responsive to a signal on horizontal filter input terminal 112 produces a signal at horizontal filter output terminal 114. The signal on horizontal filter output terminal 114 corresponds to the signal on horizontal input terminal 112 with the corresponding step transitions between the respective states of the signal on horizontal filter input terminal 112 transformed to generally aloping transitions. In a similar manner, Vertical Filter 116, responsive to a signal on vertical filter input terminal 118 produces a signal on vertical filter output terminal 120. The signal from horizontal filter output terminal 114 is coupled to vertical filter input terminal 118. As was the case with Horizontal Filter 110, Vertical Filter 116 operates upon the step transitions between the respective states of the signal on vertical input terminal 118 to transform same to generally sloping transitions. The signal on vertical filter output terminal 120 consequently corresponds to the signal on horizontal filter input terminal 112 with the previously existing step transitions in both the horizontal and vertical dimensions transformed into generally sloping transitions.

FIG. 5 illustrates the foregoing described process of Filter 26 in greater detail. As was previously discussed with respect to the implementation of the apparatus of the present invention, in the preferred embodiment, Keyer 20 is implemented using analog techniques. Consequently, Analog-to-Digital Converter 122, as more fully discussed hereinafter, is necessary. It is to be understood, however, in other implementations where the keyer output signal may be digital in nature, Analog-to-Digital Converter 122 would not be necessary, as would be apparent to one of ordinary skill in the art. Referring to FIG. 5, Analog-to-digital Converter 122 functions to convert an analog signal on its input terminal 124 to a corresponding digital format on output terminal 126. In the preferred embodiment, the signal on output terminal 126 is an eight bit digital signal. Analog-to-Digital converter 122 may be implemented by any of a wide variety of analog-to-digital conversion devices, as are well known to one of ordinary skill in the art, including the Model TDC 1048 Analog-to-Digital Converter manufactured by TRW of La Jolla, Calif. Horizontal Rectangular Filter 128 functions responsive to step transitions present on the signal coupled to horizontal rectangular filter input terminal 130 to convert same into generally sloping transitions in the signal coupled on to horizontal rectangular filter output terminal 132, as will be more fully described herinafter. Broadly stated, Memory 134 functions responsive to Control 135 to store successive digital information present on memory input terminal 136. In particular, Memory 134, in response to Control 135, operates to store sequential digital words present on memory input terminal 136 in scan line order, i.e., in the sequential order in which the digital words are received. Thereafter, however, responsive to Control 135, Memory 134 functions to couple to memory output terminal 138 the previously received digital words, however, in a somewhat modified order. In particular, sequential digital words are supplied in column order, i.e., digital words in vertically adjacent rows are sequentially supplied to memory output terminal 138, as will be more fully discussed herinafter. Hence it is understood that while digital information is supplied to Memory 134 in horizontal scan line order, the information is sequentially coupled to memory output terminal 138 of Memory 134 in vertical column order. In these regards, it is to be understood that Control 135 functions to provide control over the operation of Memory 134 with respect to the storage locations therein wherein information recieved on memory input terminal 136 is stored, as well as to provide control in selecting the storage locations from which information is subsequently retrieved and coupled to memory output terminal 138. It is further recognized in these regards that there are a wide variety of memory addressing methods which would function to achieve the foregoing, which methods are well known in the art. The functions of Memory 134 may be implemented by any of a wide variety of devices, as would be apparent to one of ordinary skill in the art, including the use of a Model TM 4164FL864KX8 Dynamic RAM module manufactured by Texas Instruments of Dallas, Tex. The functions of Control 135 may likewise be implemented by any of a wide variety of devices and techniques, as would be apparent to one of ordinary skill in the art. Vertical Rectangular Filter 140 has associated therewith vertical rectangular filter input terminal 142 and vertical rectangular filter output terminal 144, and is identical in operation to Horizontal Rectangular Filter 128, as will be more fully described hereinafter. Memory 146 responsive to Control 148 functions in a manner similar to Memory 134 and Control 135. In particular, Memory 146 responsive to Control 148 functions to store digital information present on memory input terminal 150 in the order in which it is received, i.e., vertical column order. Thereafter, however, responsive to Control 148, Memory 146 functions to couple to memory output terminal 152 the previously received digital words in scan line order; i.e., digital words for horizontally adjacent positions on a scan line are sequentially supplied to memory output terminal 152. In these regards, it is to be understood that Control 148 functions to provide control over the operation of Memory 146 with respect to storage locations therein wherein information received on memory input terminal 150 is stored, as well as to provide control in selecting the storage locations from which information is subsequently retreived and coupled to memory output terminal 152. It is further recognized in these regards that there are a wide variety of memory addressing methods which would function to achieve the foregoing, which methods are well known in the art. Memory 146 may be implemented by a Model TM 4164FL864KX8 Dynamic RAM module previously referenced. In a similar manner as Control 135, Control 148 may be implemented by any of a wide variety of devices and techniques, as would be apparent to one of ordinary skill in the art.

The foregoing described apparatus is configured in the following manner. Analog-to-digital converter input terminal 124 is coupled to keyer output terminal 24 from Keyer 20 (FIG. 3). Analog-to-digital output terminal 126 is coupled to horizontal rectangular filter input terminal 130. Horizontal rectangular filter output terminal 132 is coupled to memory input terminal 136. Memory output terminal 138 is coupled to vertical rectangular filter input terminal 142. Vertical rectangular filter output terminal 144 is coupled to memory input terminal 150. Memory output terminal 152 is coupled to RAM 32 (FIG. 3).

Figure 7:
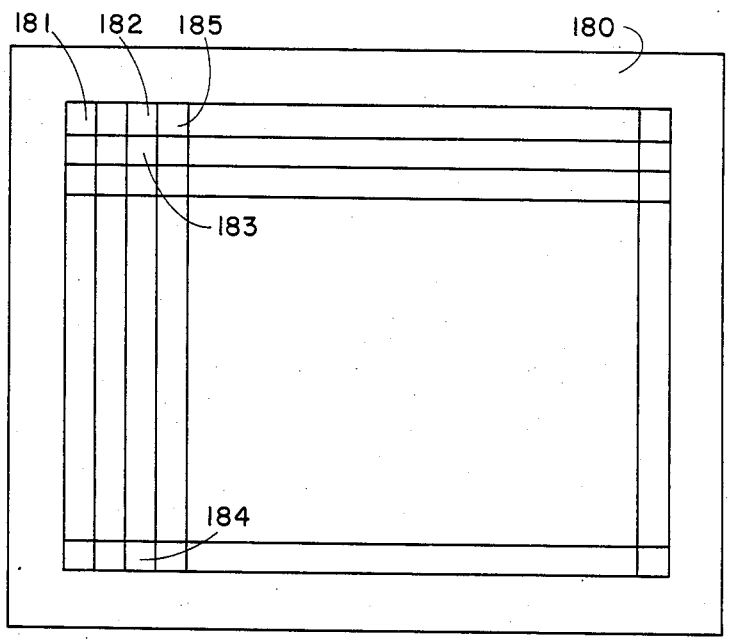
FIG. 7 broadly illustrates relational information associated with a visual image.

The operation of the foregoing described apparatus may be more fully understood by reference to FIGS. 6A through 6C. It is understood that information from Keyer 20 (FIG. 3) as represented by the output signal on keyer output terminal 24 is in a scan line format, i.e., information for consecutive positions along sequential horizontal scan line positions of a video picture are arranged in adjacent order, as previously discussed. Analog-to-Digital Converter 122 operates to convert the analog nature of the keyer output signal (FIG. 3) from Keyer 20 by sequentially sampling the analog value of the key signal, and converting the sampled values into corresponding digital values. Each digital value represents the value for the key signal associated with the corresponding picture element, commonly referred to as a pixel, along a horizontal scan line. Consequently, the signal on analog-to-digital output terminal 126 is a series of digital words, each representing a corresponding analog value of the keyer output signal for sequential pixels along a scan line. Referring to FIG. 6A, the keyer output signal is illustrated generally as rectangular wave 160, having two states: a first state 162, and a second state 163 as previously discussed with respect to FIG. 2C. The conversion of the keyer output signal to a digital format is indicated generally by analog-to-digital output signal of FIG. 6B, comprised of a plurality of discrete samples 164 corresponding to the keyer output signal. In this regard, it will be noted that those samples 166 corresponding to state 162 of the keyer output signal will have a zero value, and those samples 168 corresponding to state 163 of the keyer output signal will have a maximum value. Horizontal Rectangular Filter 128 operates to change the step nature of a transition between the states of digitized key signal 164 to one having generally sloping ramps, as illustrated generally in FIG. 6C by signal 170. It will be observed with respect to signal 170, that the step transition from the group of 166 of zero values (FIG. 6B) to the group 168 of maximum values have been replaced by a plurality of generally increasing values 172 in signal 170 between the group 174 of values corresponding to the minimum value to the group 176 corresponding to the maximum value. In a similar fashion, the step transition from the group 168 of maximum values to the group 166 of minimum values has been replaced by a plurality 178 of generally decreasing values from the group 176 of maximum values to the group 179 of minimum values. In this regard it will be understood that the precise nature of the transition between the respective minimum and maximum states, i.e., states 174 and 176, may be chosen according to the nature of the desired effect with the glow signal. In the preferred embodiment, a linear transition was employed, as will be more fully described hereinafter. However, it is to be understood that the principles of the present invention encompass a wide variety of possible transitions other than linear, as would be apparent to one of ordinary skill in the art. The foregoing described digital values from Horizontal Rectangular Filter 128 are thereafter stored in Memory 134 in the previously discussed scan line order. The manner in which the series of sequential digital values from Horizontal Rectangular Filter 128 are stored in Memory 134 is functionally illustrated in FIG. 7. Referring to FIG. 7, a two dimensional matrix 180 is generally indicated having a plurality of rows and columns describing a plurality of cells 181. Each cell in the aforedescribed matrix may be considered as capable of storing one digital word. In such a representation, the digital words corresponding to the digitized information in a single scan line from a video image would be stored in horizontally adjacent cells. By way of example with respect to the digitized signal 170 produced by Horizontal Rectangular Filter 128, the plurality of sequential values comprising the digitized signal 170 would be stored in a single row. In particular, the first group 174 of minimum values would be stored in a corresponding plurality of sequential horizontal cells in a row, followed by the plurality of sequential values 172 comprising the linear transition, followed by the plurality of sequential values 176, followed by the plurality of sequential values 178, followed by the plurality of sequential values 179. In a similar fashion, video information for each successive scan line would be similarly stored in Memory 134. Thereafter, the information contained in matrix 180 would be read therefrom and coupled to memory output 138 by Control 134 in column order. In particular, the digital words stored in vertically adjacent cells would be sequentially supplied to memory output terminal 138. By way of example, the digital word occurring in a cell at the top of a column 182 would be first supplied to memory output terminal 138, thereafter followed by the digital word occurring in the vertically adjacent cell 183 thereunder. The process would thereafter repeat until the video information from the last cell 184 in the column was coupled to memory output terminal 138. Thereafter, the digital word occurring in cell 185 at the top of the next horizontally adjacent column would be coupled to memory output terminal 138. The foregoing described process would thereafter repeat until the entire contents of Memory 134 had been coupled on to memory output terminal 138. In this regard it is understood that storage locations contained within Memory 134 are generally arranged in a sequential order. Consequently it is understood that the foregoing functional description was for the purpose of functionally illustrating the manner in which information was stored in and subsequently extracted from Memory 134. The foregoing described functional operation would be implemented through manipulation of the addresses of the individual cells, or storage locations in Memory 134 by Control 135, as would be apparent to one of ordinary skill in the art. Vertical Rectangular Filter 140 operates in an identical manner to the operation of Horizontal Rectangular Filter 128. Memory 146 operates in a similar manner to Memory 134. In particular, as video information is processed in column order from Memory 134 by Vertical Rectangular Filter 140, the signal on vertical rectangular filter output terminal 144 is likewise in column order. Consequently Memory 146 stores the sequential digital words from Vertical Rectangular Filter 140 in column order, pursuant to Control 148. Information contained in Memory 146 is thereafter coupled to memory output terminal 152 in scan line order, i.e., information is thereafter read from Memory 146 in horizontal scan line order.

Figure 8:
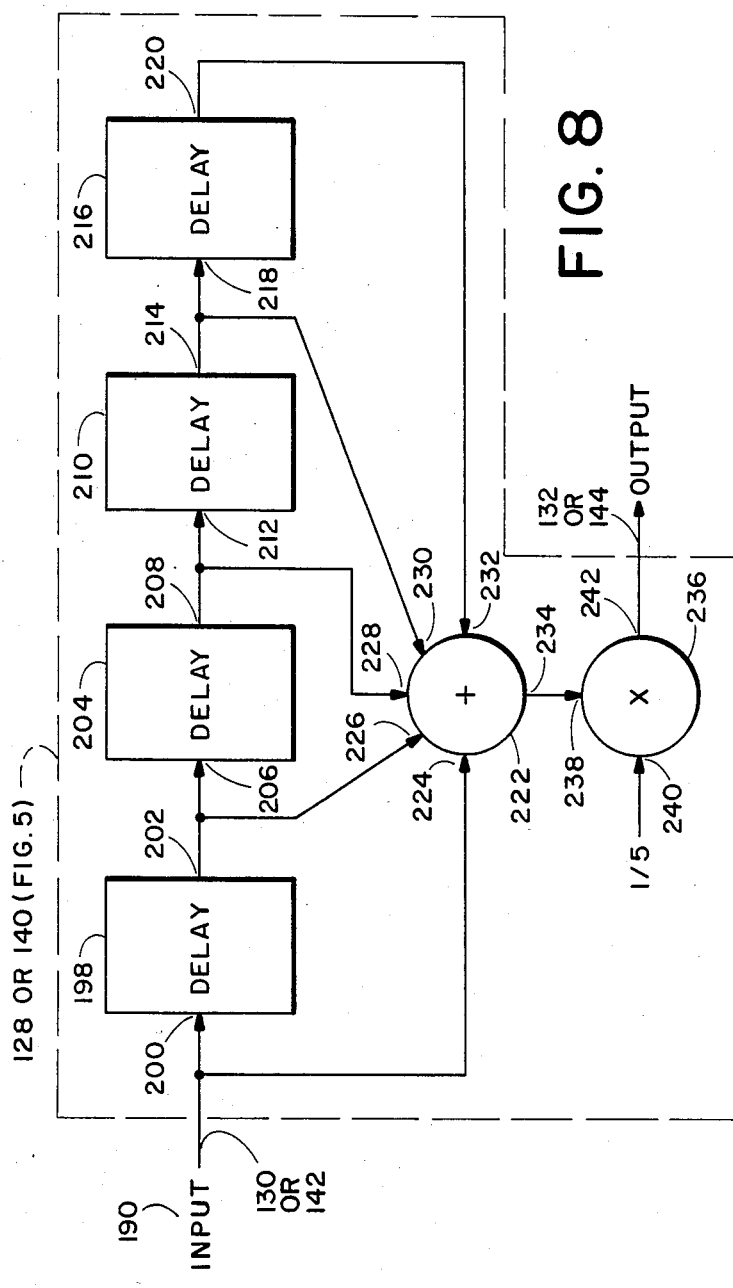
FIG. 8 illustrates a typical finite impulse response rectangular digital filter.

Horizontal Rectangular Filter 128 and Vertical Rectangular Filter 140 may be implemented by any of a wide variety of methods. In the preferred embodiment, Horizontal Rectangular Filter 128 and Vertical Rectangular Filter 140 are implemented by a finite impulse response rectangular digital filter. FIG. 8 broadly illustrates the operation of a finite impulse response rectangular digital filter having four stages of delay. Referring to FIG. 8, Input signal 190 represents a digital input signal, and in general will be comprised of a plurality of bits. In the preferred embodiment, the input signal is comprised of 8 bits. Delay 198 is a digital delay device, and has associated therewith input terminal 200 and output terminal 202. Delay 198 functions responsive to the signal on input terminal 200 to produce an output signal on output terminal 202 delayed by a preselected period of time. In particular, the digital word coupled to input terminal 200 will be coupled to the output terminal 202 subsequent to the expiration of the preselected period of time. Delays 204, 210, and 216 has associated therewith input terminals 206, 212 and 218 respectively, as well as output terminals 208, 214 and 220 respectively, and function in a identical manner to Delay 198. Delays 198, 204, 210 and 216 may be implemented in any of a wide variety of ways which would be apparent to one of ordinary skill in the art, including shift registers and parallel transfer registers. Adder 222 has associated therewith input terminals 224, 226, 228, 230 and 232, and output terminal 234, and functions responsive to the digital information on the respective inputs thereto, to produce on output terminal 234 a digital signal equal to the sum of the digital signals present on the input terminals thereto. Multiplier 236 has associated therewith input terminals 238 and 240, and functions to produce an output signal equal to the product of the digital inputs present on input terminals 238 and 240 thereto.

The foregoing described apparatus of FIG. 8 is configured in the following manner. Input signal 190 is coupled to input terminal 200. Delay 198 output terminal is coupled to input terminal 206. In a similar fashion, the output signal on output terminals 208, and 214 are coupled to input terminals 212 and 218, respectively. In addition, Input Signal 190 is further coupled to adder input terminal 224. In a similar fashion, delay output terminals 202, 208, 214 and 220 are coupled to adder input terminals 226, 228, 230 and 232 respectively. Adder output terminal 234 is coupled to multiplier input terminal 238. A digital signal representative of a constant numerical value is coupled to multiplier input terminal 240. In general, the digital constant signal coupled to multiplier input terminal 240 is equal to the reciprocal of the number of adder inputs of the filter. Consequently in the illustrative apparatus of FIG. 8, the digital constant signal coupled to multiplier input terminal 240 would be one-fifth.

Broadly stated, the foregoing described apparatus operates to determine the average of the numerical values represented by the digital words contained in the delay elements, i.e., Delay 198, 204, 210 and 216. In particular, a first digital word from Input terminal 190 is coupled to Delay 198. After expiration of the preselected delay time, the digital word contained in Delay 198 is transferred to Delay 204, and a subsequent digital word is coupled to Delay 198. The foregoing process is thereafter repeated with the sequence of digital words present on input terminal 190 being sequentially transferred to delay devices 198, 204, 210 and 216. When the digital word first received by Delay 198 is finally transferred to Delay 216, the preceding delay devices would contain subsequently received digital words. Summing device 222 operates to continuously determine the sum of the digital words contained on the terminals of each of Delays 198, 204, 210 and 216. Consequently, the summing device output signal represents the sum of the digital words on the terminals of each of Delay Devices 198, 204, 210 and 216. Consequently it is observed that as sequential digital words are received, the output signal 234 from Adder 222 will correspondingly change to reflect the sum of the digital words contained on the terminals of Delay 198, 204, 210 and 216 as those signals change. Multiplier 236 produces an output signal on terminal 242 equal to the product of the signals on the two input terminals 238 and 240 supplied thereto. As the signal on input terminal 238 represents the sum of the contents on the five terminals of the foregoing four delay devices, the multiplication of the sum by the reciprocal of the number of adder inputs, i.e., one-fifth in this example, produces the numeric average of the input signals to the adder. It is further noted that pursuant to the coupling of a subsequent digital word from Input terminal 200 to Delay 198, each delay device will operate to shift its contents to the subsequent delay device, with the contents of the last delay device, i.e., Delay 216, being discarded. Consequently the foregoing described apparatus operates to continuously form the average of the digital words contained on the terminals of the delay devices. The foregoing principle could be extended to continuously determine the average of n numeric values by a similar design having n−1 delay devices, an adding device capable of summing the values of the output signals of each of the n delay devices, and a multiplying device to form the product of the sum with the reciprocal of the number of adder inputs.

From the foregoing described operation of the apparatus of FIG. 8, it is apparent that the apparatus of FIG. 8, in response to the sequence 164 of digital values (FIG. 6B) would produce an output signal from Multiplier 236 (FIG. 8) of the corresponding digital values 170 (FIG. 6C), i.e., the step nature of the transition between the two states 166 and 168 of FIG. 6B would be altered to the corresponding linearly increasing or decreasing group 172 or 178 of FIG. 6C, respectively, as the plurality of digital words comprising signal 164 sequentially pass through the aforedescribed apparatus of FIG. 8. It will be further observed that the width of the linear transition, i.e., the number of digital words which occur during the transition period, is determined by the number of delay elements present in the finite impulse response rectangular digital filter. As will be more fully discussed hereinafter, the number of delay elements will determine the width of the glow around the insert image in the present invention.

Figure 9:
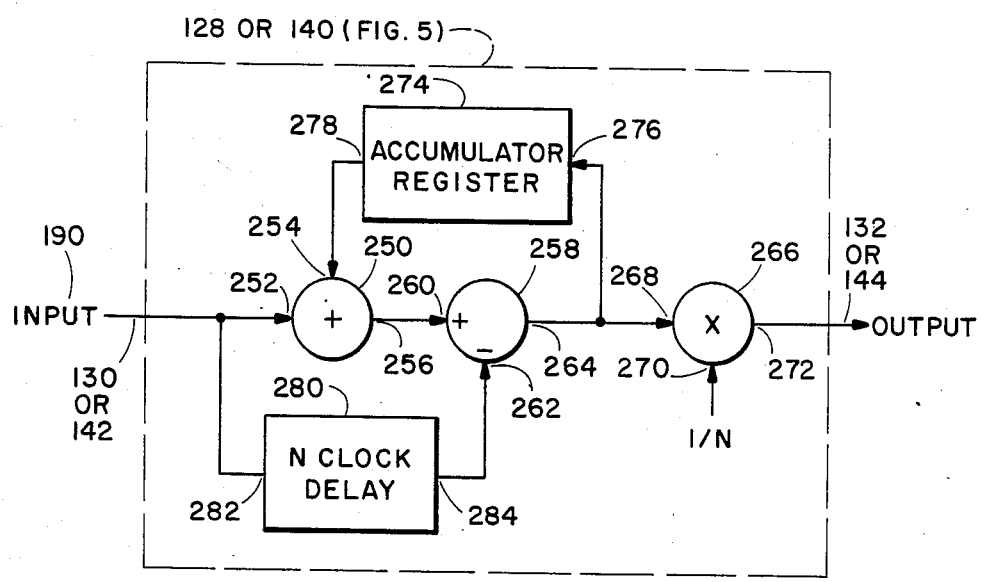
FIG. 9 illustrates the finite impulse response rectangular digital filter employed in the preferred embodiment of the present invention.

While the apparatus of FIG. 8 performs the necessary aforedescribed functions of Horizontal Rectangular Filter 128 and Vertical Rectangular Filter 140, the functional apparatus of FIG. 9 was employed in the preferred embodiment. Referring to FIG. 9, Adder 250 has associated therewith adder input terminals 252 and 254, and adder output terminal 256. Adder 250, responsive to digital words being coupled to adder input terminals 252 and 254, operates to form a signal representative of the sum thereof on adder output terminal 256. Adder 250 may be implemented in any of a wide variety of ways, as would be apparent to one of ordinary skill in the art, including the use of Model 74F283 4 Bit Binary Adder integrated circuits manufactured by Fairchild of South Portland, Maine. Subtractor 258 has associated therewith subtractor input terminals 260 and 262 and subtractor output terminal 264. Subtractor 258, responsive to digital words being coupled to subtractor input terminals 260 and 262, operates to form a signal representative of the difference therebetween on subtractor output terminal 264, i.e., the subtractor output signal is determined by subtracting the digital word coupled to subtractor input terminal 262 from the digital word coupled to subtractor input terminal 260. Subtractor 258 may be implemented in any of a wide variety of ways, as would be apparent to one of ordinary skill in the art, including the use of a Model 74F382 Arithmetic Logic Unit manufactured by Fairchild. Multiplier 266 has associated therewith multiplier input terminals 268 and 270, and multiplier output terminal 272. Multiplier 266 functions to form the product of the digital words coupled to the respective input terminals thereto, i.e., multiplier input terminals 268 and 270. The product so produced is coupled to multiplier output terminal 272. Multiplier 266 may be implemented in any of a wide variety of ways, as would be apparent to one of ordinary skill in the art, including the use of a Model MPY 122K integrated circuit manufactured by TRW Inc. Accumulator Register 274 has associated therewith accumulator register input terminal 276 and accumulator register output terminal 278. Accumulator Register 274 is a single stage register which functions to temporarily store the digital word present on accumulator register input terminal 276. In the preferred embodiment, accumulator register 274 can accomodate thirteen bits. Accumulator Register 274 may be implemented in any of a wide variety of ways, as would be apparent to one of ordinary skill in the art, including the use of Model 74F374 8 Bit Latch integrated circuits manufactured by Fairchild. N Clock Delay 280 has associated therewith N clock delay input terminal 282 and N clock delay output terminal 284, and functions to produce on N clock delay output terminal 284 and sequential series of digital words which were previously sequentially coupled to N clock delay input terminal 282, delayed by a preselected period of time. N Clock Delay 280 may be implemented in any of a wide variety of ways, as would be apparent to one of ordinary skill in the art, including the use of Model IDT 7201 512X9 FIFO integrated circuits manufactured by Integrated Device Technology of Santa Clara, Calif.

The foregoing described apparatus of FIG. 9 is configured in the following manner. Input signal 190 is a digital word comprised of a plurality of bits, and is coupled to input terminal 252 of Adder 250 and to input terminal 282 of N Clock Delay 280. Output terminal 256 of Adder 250 is coupled to input terminal 260 of Subtractor 258. Output terminal 284 of N Clock Delay 280 is coupled to input terminal 262 of Subtractor 258. Output terminal 264 of Subtractor 258 is coupled to input terminal 268 of Multiplier 266 and to input terminal 276 of Accumulator Register 274. Output terminal 278 from Accumulator Register 274 is coupled to input terminal 254 of Adder 250. Input terminal 270 of Multiplier 272 is disposed to receive a digital word having a value representative of the reciprocal of the number of preselected delay associated with N Clock Delay 280.

The foregoing described apparatus of FIG. 9 operates in the following manner. Disregarding the operation of N Clock Delay 280 for the moment, it will be observed that Adder 254, Subtractor 258 and Accumulator Register 274 operate to continuously determine the sum of the successive digital words presented to Input terminal 252. In particular, assuming starting from an initial condition wherein Accumulator Register 274 has zero stored therein, the first digital word present on Input signal 190 is added to the contents of Accumulator Register 274 forming the sum thereof. Thereafter, that sum will be stored in Accumulator Register 274. Upon receipt of the next digital word on Input terminal 252, Adder 250 will operate to add that digital word to the contents of Accumulator Register 274, thereafter storing the sum back into Accumulator Register 274. The foregoing process repeats to continuously sum sequential digital words received on Input terminal 252. Now considering the operation of N Clock Delay 280, it is observed that N Clock Delay 280 operates to effect the subtraction from the accumulating sum of the representative values of the successive digital words which have been delayed by the preselected period associated with N Clock Delay 280. In particular, the amount of preselected delay chosen for N Clock Delay 280 will determine the number of digital words which will be successively summed by the foregoing described apparatus. Hence, when comparing the apparatus of FIG. 9 with that of FIG. 8, the amount of preselected delay chosen for N Clock Delay 280 will determine the number of adder inputs in the apparatus of FIG. 8 to which the apparatus of FIG. 9 is equivalent. In this regard, it will be observed that the foregoing described apparatus operates to produce the sum of a preselected number of digital words corresponding to the output signal of Summing Device 222 (FIG. 8). Consequently, the subsequent product formed by Multiplier 266 will be the average of the foregoing described digital words.

Referring back to FIG. 3, it is apparent from the foregoing that the operation of Filter 26, implemented as illustrated in FIG. 5, with Horizontal and Vertical Rectangular Filters 128 and 140, respectively, implemented as illustrated in FIG. 9, in response to the Keyer output signal (FIG. 6A), will produce the corresponding key signals with generally linear transitions as illustrated by signal 170 (FIG. 6C) in both the horizontal and vertical dimensions. However, it was observed that control over the maximum intensity attainable by a glow around the edges of an insert object was generally desirable; i.e., the final value achieved by the key signal during the linear portion thereof prior to full insert, and in a similar manner, the initial value of the key signal immediately subsequent to full insert of an insert image. In particular, varying visual effects may be achieved with the key signal by varying the values of the ramping portion of the key signal.

Figure 10A:
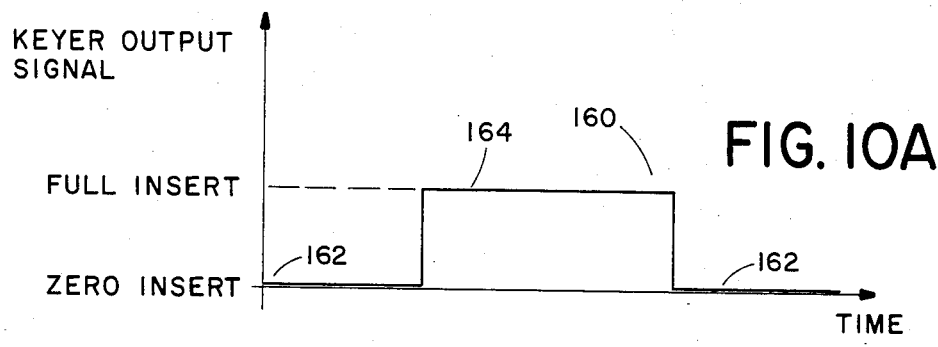
FIGS. 10A-10C illustrate considerations associated with limiting a glow signal adjacent to the borders of an insert image.
Figure 10B:
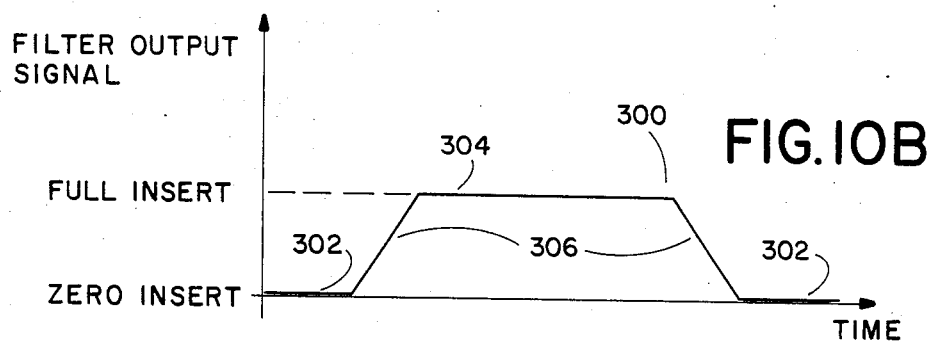
Figure 10C:
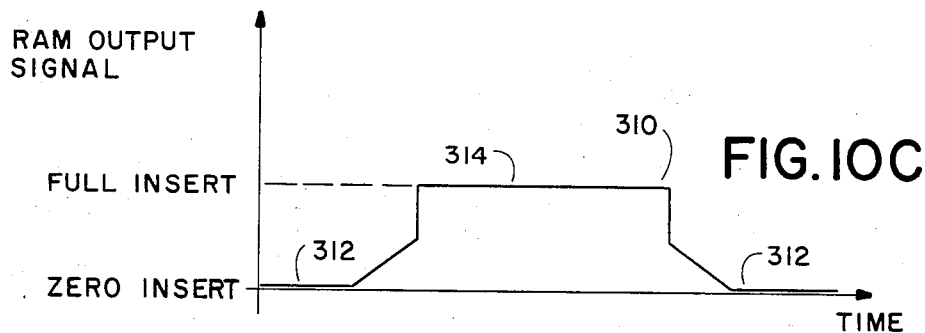

The foregoing considerations are broadly illustrated in FIGS. 10A through 10C. Referring to FIG. 10A, the keyer output signal from Keyer 20 (FIG. 3) is broadly illustrated in one dimension. It will be recalled that the zero insert level of the keyer output signal, designated generally by reference designator 162 in FIG. 10A, corresponds to the inserting of border video signal 52 into video mixer output signal of Video Mixer 10, and the full insert level of keyer output signal, designated generally by reference designator 164 in FIG. 10A, corresponds to the inserting of insert video signal 54 into video mixer output signal of Video Mixer 10. As previously discussed, the method and apparatus of the present invention operate to alter the transition between segments 162 and 164 of keyer output signal to generally linearly sloping transitions, as broadly illustrated by signal 300 of FIG. 10B. It will be further recalled with respect to signal 300 that coupling such signal to video mixer input key signal of Video Mixer 40 (FIG. 3) will result in the complete coupling of background video signal 48 to the composite signal during the periods at which signal 300 is at the zero insert level, i.e., during the segments indicated by reference designators 302 in FIG. 10B, and the complete coupling of the delay output signal from Delay 80 to the composite video signal 51 during the period at which signal 300 is at the full insert level, i.e., during the segment indicated by reference designator 304 in FIG. 10B. It will be further recalled that during the transitions between zero and full insert, that the composite signal will be composed of varying amounts of background video signal 48 (FIG. 3) and the delay output signal in accordance with Equation (1) as previously discussed. It will be noticed, however, that the video signal which is mixed with background image signal 48 during the transitions 306, i.e., the delay output signal, is composed entirely of border video signal 52. Consequently composite video signal 51 will contain continuously increasing amounts of border video signal 52 prior to the full insert of insert video signal 54 into the composite signal, and continuously decreasing amounts of border video signal 52 subsequent to the full insert of insert video signal 54 into the composite signal. In particular, however, due to the fact that signal 300 increased continuously up to the full insert point, and subsequently decreases in a continuous fashion subsequent to the full insert point, border video signal 52 will predominate around the edges of the insert video image 54 in the composite signal. It has been found, however, that a broader range of special effects may be achieved by varying the value achieved by signal 300 immediately prior and subsequent to full insert of the insert video image. The foregoing limiting is broadly illustrated in signal 310 of FIG. 10C. Referring to FIG. 10C, signal 310 is at zero insert level during portions 312 corresponding to segment 302 of signal 300 (FIG. 10B), and at full insert level during portion 314 corresponding to segment 304 of signal 300. However, during the transitions between zero and full insert level, signal 310 achieves a final value between zero and full insert value, i.e., in the transition between zero insert and full insert, signal 310 generally linearly increases to a final value which is less than the full insert value, and in the transition between full insert and zero insert, signal 310 generally linearly decreases from an initial value which is less than the full insert value, to zero insert value. In these regards, it is understood that signal 310 includes a step response between the final values associated with the generally linearly increasing or decreasing portions and the full insert value. By controlling the maximum value achieved by the generally linearly increasing or decreasing portion, the level of the glow signal directly adjacent to the insert image may be controlled, as more fully discussed hereinafter.

Figure 11:
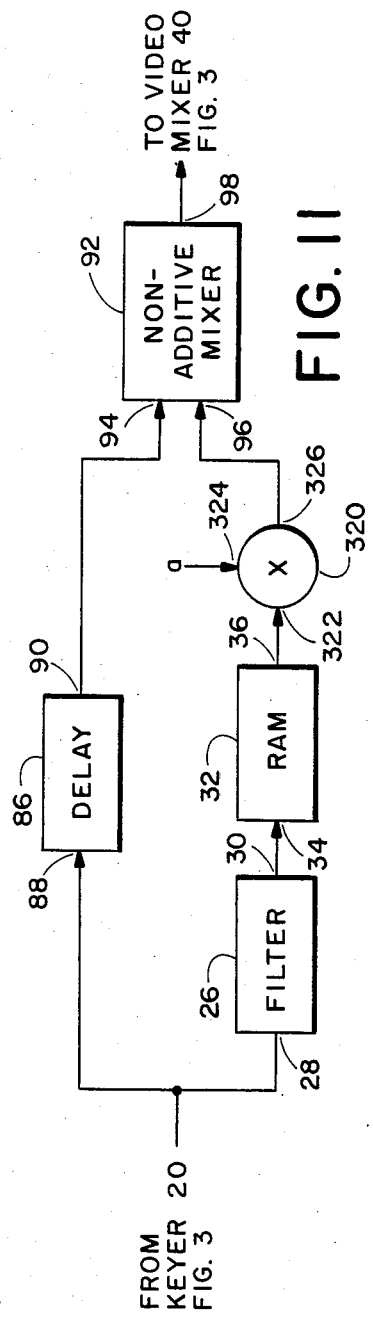
FIG. 11 illustrates a functional approach to the limiting of a glow signal adjacent to the borders of an insert image.

The apparatus for producing the foregoing described key signal is functionally illustrated in FIG. 11. FIG. 11 is similar to a portion of FIG. 3, and corresponding elements have been given corresponding reference designators. Referring to FIG. 11, Delay 86, Filter 26, RAM 32 and Non-Additive Mixer 92 are functionally identical to the corresponding elements previously discussed with respect to FIG. 3. Attentuator 320 has associated therewith attentuator input terminal 322, attenuation constant input terminal 324 and attentuator output terminal 326. Attentuator 320 functions to provide an output signal equal to the input signal on attentuator input terminal 322 attenuated by an amount determined by attenuation constant applied to input terminal 324. The apparatus of FIG. 11 is configured in an identical manner as previously illustrated in FIG. 3, with the exception that RAM output terminal 36 is coupled to attentuator input terminal 322, and attentuator output terminal 326 is coupled to non-additive mixer input terminal 96. Broadly stated, the foregoing described apparatus operates in an identical manner to that illustrated in FIG. 3, with the additional feature that Attentuator 320 operates to provide attenuation of the output signal from RAM 32, as illustrated generally in FIGS. 12A through 12E. The keyer output signal produced by Keyer 20 (FIG. 3) is illustrated in FIG. 12A, with the results of the operation of Filter 26 and RAM 32 thereon illustrated in FIG. 12B, as previously discussed. FIG. 12C illustrates the signal from terminal 326 of Attentuator 320 in response to the RAM output signal illustrated in FIG. 12B. In this regard, it is observed that the final value achieved by the generally linearly increasing transitions have been limited to a value less than the full insert value, according to the amount of attenuation provided by attenuation constant. The output signal from Delay 86 (FIG. 11) is illustrated in FIG. 12D, and represents the original keyer output signal of FIG. 12A delayed in time by a period equal to the processing time associated with the signal path through Filter 26, RAM 32 and Attentuator 320. Non-additive Mixer 92 operates to couple to its output terminal 98 the larger of the two signals coupled to non-additive mixer input terminal 94 and 96; as illustrated in FIGS. 12C, 12D, and 12E. It is consequently observed that the amount of matte video signal 52 adjacent to the insert video image may be limited to between zero and full insert, according to the value of the attenuation factor applied to Attentuator 320.

While the foregoing has functionally illustrated the operations associated with limiting the glow adjacent to the insert image, in the preferred embodiment the operations of attenuator 320 are performed by RAM 32. In particular, each of the digital values produced by Filter 26, i.e., the digital words read from Memory 146, represent a corresponding relative intensity level for the key signal. However, instead of being used to directly specify a level for the key signal, they are instead used in a mapping or level translation scheme. In particular, each of the digital words is used to specify an address contained within RAM 32 wherein is stored the corresponding desired level for the key signal corresponding to the level of the key signal stored in Memory 146 (FIG. 5). In the preferred embodiment, the digital words representing the key signal from Memory 146 are used to address storage locations within RAM 32. Broadly stated, as each of the digital words from Memory 146 represents a corresponding intensity level for the key signal, RAM 32 stores the desired level associated therewith. In particular, as each of the values stored in Memory 146 represent a level intensity for the key signal, rather than employ these values to directly represent the intensity level, they are instead used to specify addresses contained with in RAM 32. The corresponding values stored in the respective storage locations within RAM 32 specified by the particular digital words from Memory 146 define the corresponding desired level of intensity for the resulting key signal. In addition to the foregoing, the above described technique further allows ease in changing the shape of the glow by storing the corresponding digital words in the respective storage locations.

While the foregoing described method and apparatus does indeed function to achieve the desired glow around an insert image, it was found that more efficient use could be made of the digital filters employed herein. Broadly stated, the foregoing described method and apparatus utilize only one-half of the impulse response of the digital filter employed in Filter 26 (FIG. 3), i.e., the ramp produced by the digital filter (FIG. 8) lays half inside and half outside of the insert object outline as defined by keyer output signal. This wastes one-half of the digital filters capabilities. As the width of the glow produced by the foregoing described method and apparatus is determined by the width of the associated digital filter, e.g., the number of delay elements 198, 204, 210 and 216 (FIG. 8), or the value of n associated with the previously discussed apparatus of FIG. 9, the number of delay elements required for increasing glow widths correspondingly increase.

The performance of the foregoing method and apparatus may be yet further improved with respect to the production of glow patterns around narrow insert images. In particular, referring once again to FIGS. 6 and 8, it will be recalled that the generally linear transition 172 and 178 (FIG. 6C) results from the averaging process performed by Adder 222 and Multiplier 236 (FIG. 8) in response to the sequential propagation of the sequence of digital words indicating full insert from Input signal 190 through the associated delay elements, i.e., Delays 198, 204, 210 and 216. However, while the previously described operation of the apparatus of FIGS. 8 and 9 will produce the previously referenced generally linear transition 172 and 178 (FIG. 6C), it will be noticed that the foregoing assumes a key signal of a sufficient duration to result in the corresponding output signal on terminal 242 (FIG. 8) of the digital filter to reach a final value indicating full insert. Referring once again to FIG. 8 for illustration purposes, it is observed that if Input signal 190, i.e., the key signal coupled thereto, remains in the full insert state, i.e., a high state, for a sufficient period of time such that the corresponding digital values for the high state exist simultaneously at each of the adder inputs, the output signal on terminal 242 from the digital filter will likewise reach the high state, corresponding to the full inserting of the video mixer output signal into background image signal 48 of the composite signal. However, if the key signal coupled to Input terminal 194 remains in the high state for a period of time which is insufficient to allow all the adder inputs to be in the high state at the same time, the output signal on terminal 242 of the digital filter will not reach the desired value associated with the full insert level. By way of example, if the digital key signal coupled to Input terminal 194 contains only two digital words in the high or full insert state, then the output signal will only reach 40% of the high or full insert state. Consequently, it is observed that whenever the number of samples in the high state of a key signal is less than the number of adder inputs (FIG. 8) or the number of equivalent adder inputs (FIG. 9), the resulting key signal from the digital filter will not reach the full insert value.

Figure 13:
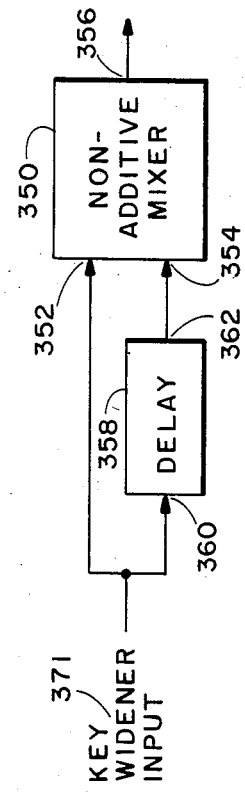
FIG. 13 illustrates apparatus for the widening of a key signal.

A solution to the above discussed shortcoming is to lengthen the key signal. One approach to lengthen the key signal would be the combining in a non-additive mixer of a delayed version of the original key signal with the original key signal. This approach is illustrated generally in FIG. 13. Referring to FIG. 13, Non-additive Mixer 350 has associated therewith first input terminal 352, second input terminal 354 and output terminal 356. Non-Additive Mixer 350 is identical to Non-additive Mixer 92 previously discussed with reference to FIG. 3. Delay 358 has associated therewith input terminal 360 and output terminal 362, and is identical in operation to Delay 86 previously discussed with respect to FIG. 3, differing only by the period of time by which the signal appearing on delay output terminal 362 is delayed from the signal applied to delay input terminal 360. Key widener input signal 371 is simultaneously applied to non-additive mixer first input terminal 352 and to delay input terminal 360. Delay output terminal 362 is coupled to non-additive mixer second input terminal 354.

Figure 14A:
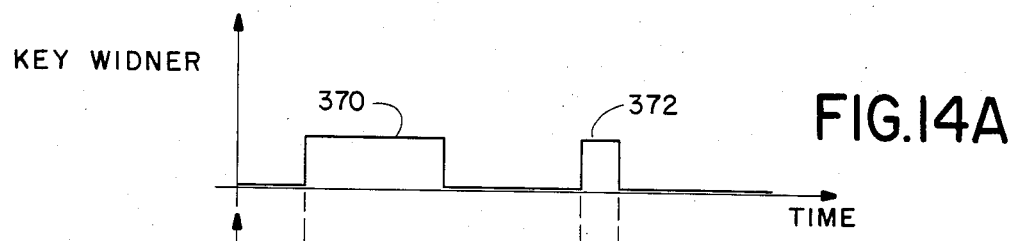
FIGS. 14A-14C illustrates waveforms associated with the apparatus illustrated in FIG. 13.
Figure 14B:
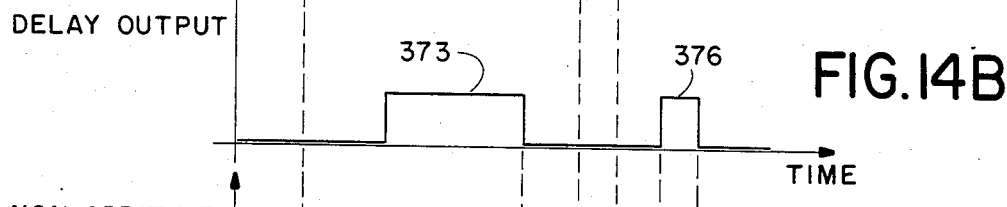
Figure 14C:
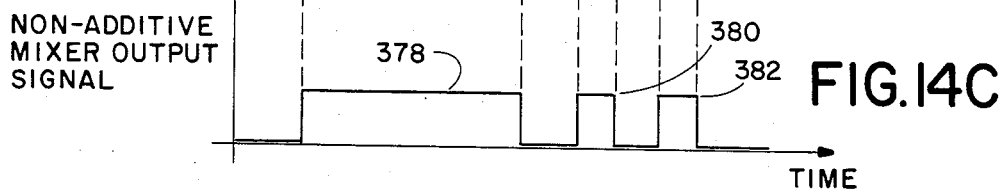

The operation of the apparatus of FIG. 13 may be understood by reference to FIGS. 14A through 14C.

Referring to FIG. 14A, two successive signals 370 and 372 having different widths are illustrated. FIG. 14B illustrates the respective delayed versions 373 and 376 of signals 370 and 372 produced by Delay 358, respectively, i.e. the delayed output signal of Delay 358 in response to signals 370 and 372. FIG. 14C illustrates the signals resulting from the combining of the original and delayed key signals by Non-Additive Mixer 350. In particular, signal 378 results from the non-additive mixing of signals 370 and 373, and does indeed produce a resulting signal 378 which is wider than the original signal 370. However, it will be observed that the non-additive mixing of signal 372 with the delayed version 376 does not produce one signal having a width wider than the original signal 372, but instead produces two separate signals. Consequently it is observed that the non-additive mixing of a delayed and non-delayed key signal will not provide a key signal having a width greater than the original key signal when the width of the original key signal is less than the amount of delay associated with the delayed key signal.

Figure 15:
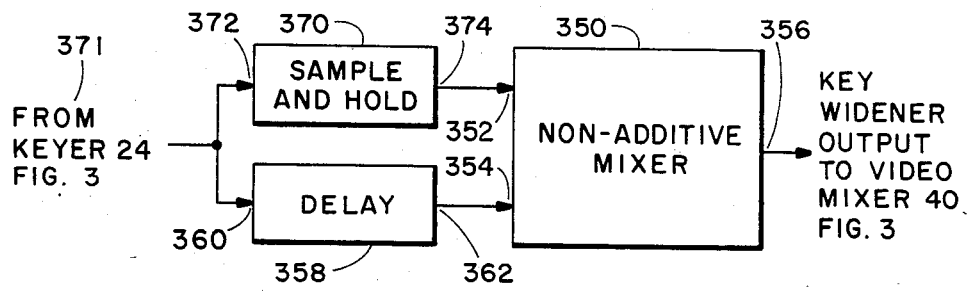
FIG. 15 illustrates a functional block diagram of apparatus employed in the preferred embodiment of the present invention to widen a key signal.

In the preferred embodiment of the present invention, a widened key signal is achieved by the addition of a modified sample and hold apparatus to the apparatus previously described with respect to FIG. 13, as functionally illustrated in FIG. 15. FIG. 15 is similar to FIG. 13, and corresponding elements have been given corresponding reference designators. Referring to FIG. 15, Sample and Hold 370 has associated therewith input terminal 372 and output terminal 374. Keyer widener signal 371 instead of being coupled directly to non-additive mixer first input terminal 352, as in FIG. 13, is instead coupled to sample and hold input terminal 372. Sample and hold output terminals 374 is coupled to non-additive mixer input terminal 352. Non-Additive Mixer 350 may be implemented by any of a wide variety of non-additive mixing devices well known to one of ordinary skill in the art. Delay 358 may likewise be implemented by any of a wide variety of delay devices well known to one of ordinary skill in the art, including the Model IDT 7201 512X9 FIFO manufactured by Integrated Device Technology, previously referenced.

Figure 16:
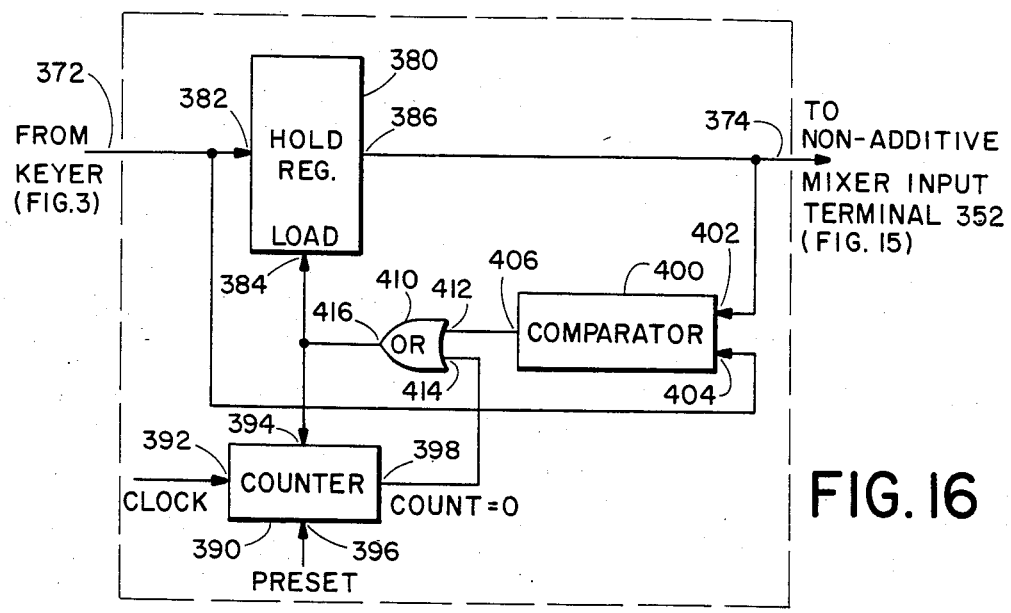
FIG. 16 illustrates apparatus employed in the preferred embodiment of the present invention to widen a key signal.

The operation of Sample and Hold 370 is functionally illustrated in FIG. 16. Referring to FIG. 16, Hold Register 380 has associated therewith hold register input terminal 382, hold register load command input terminal 384, and hold register output terminal 386. Hold Register 380 functions to store the value of the signal present on hold register input terminal 382 responsive to a signal present on hold register load command input terminal 384, coupling the value thereof to hold register output terminal 386. Hold Register 380 may be implemented by any of a wide variety of devices well known to one of ordinary skill in the art, including the Model 74F377 Octal Latch with Clock Enable manufactured by Fairchild. Counter 390 has associated therewith counter clock input terminal 392, counter load present command terminal 394, counter preset value input terminal 396, and counter count equal zero terminal 398. Counter 390 functions responsive to a signal on counter load present terminal 394 to couple the value of the signal on counter present value terminal 396 therein, and thereafter responsive to the clock signal to decrement the value so stored, producing a signal on counter count equal zero terminal 398 when the contents of Counter 390 equals zero. It is understood with respect to the operation of the apparatus of FIG. 16 that the clock signal coupled to clock input terminal 392 of Counter 390 functions to decrement the count contained in Counter 390 from the initial value stored therein through subsequent values to the final value of zero, at which time producing a signal on counter count equal zero terminal 398. In the preferred embodiment, the aforedescribed clock signal was generated coincident with each transfer of information from Keyer 20 to Hold Register terminal 382. However, there are many other ways in which the clock signal may be produced, as would be apparent to one of ordinary skill in the art. Counter 390 may be implemented by any of a wide variety of devices well known to one of ordinary skill in the art, including the 74F163 4 Bit Binary Counter integrated circuits manufactured by Fairchild.

Comparator 400 has associated therewith input terminals 402 and 404, and output terminal 406. Comparator 400 functions to produce a signal on comparator output terminal 406 in response to the condition wherein the value of the signal present on comparator input terminal 404 is greater than or equal to the value of the signal present on comparator input terminal 402. Comparator 400 may be implemented by any of a wide variety of devices well known to one of ordinary skill in the art, including the Model 74AS885 8 Bit Comparator manufactured by Fairchild. OR Gate 410 has associated therewith input terminals 412 and 414, and output terminal 416, and functions to produce a signal on output terminal 416 in response to the presence of a signal on either input terminal 412 or 414. OR Gate 410 may be implemented by any of a wide variety of devices well known to one of ordinary skill in the art, including the Model 74F32 Quad OR Gate integrated circuit manufactured by Fairchild.

The foregoing described apparatus is configured in the following manner. Key widener input signal 371 is coupled to hold register input terminal 382 and to comparator input terminal 404. Hold register output terminal 386 is coupled to comparator input terminal 402, and further to non-additive mixer input terminal 352 (FIG. 15). In this regard, hold register output terminal 386 forms the output terminal of the apparatus broadly illustrated in FIG. 16, and in this regard corresponds to sample and hold output terminal 374 (FIG. 15). Comparator output terminal 406 is coupled to OR Gate input terminal 412. Count equal zero output terminal 398 is coupled to OR Gate input terminal 414. OR Gate output terminal 416 is coupled to hold register load command input terminal 384 and to counter load present command terminal 394. A clock signal is coupled to counter clock terminal 392, and a value corresponding to a desired delay, as will be more fully discussed hereinafter, is coupled to counter preset terminal 396.

Figure 17:
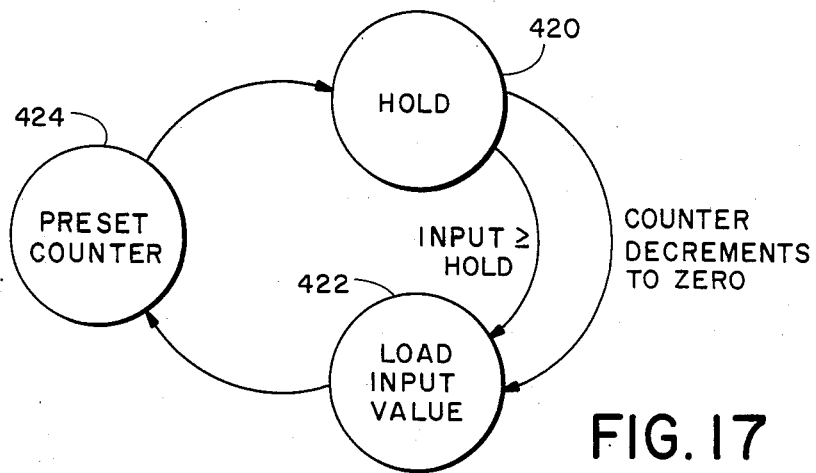
FIG. 17 illustrates a state diagram associated with the operation of the apparatus illustrated in FIG. 16.

The operation of the apparatus of FIG. 16 may be understood by reference to the state machine diagram of FIG. 17. Referring to FIG. 17, there are three states: Hold State 420, Load Input Value State 422 and Present Counter State 424. Hold State 420 corresponds to Hold Register 380 (FIG. 16) maintaining the current value therein. Load Input Value State 422 corresponds to the loading of the representative value of the signal present on hold register input terminal 382, i.e., the keyer output signal into Hold Register 380. Preset Counter State 424 corresponds to the presetting of Counter 390 with the representative value of the signal present on counter present value terminal 396. The transitions among the foregoing states occur in the following manner. Hold Register 380 will continue to hold the value currently therein in response to the repesentative value of the signal present on hold register input terminal 382, i.e., keyer output signal, being less than the present value being held by Hold Register 380. A transition from Hold State 420 to Load Input Value State 422 may occur in response to one of two conditions: the representative value of the signal present on hold register input terminal 382 being either equal to or greater than the representative value currently being held by Hold Register 380; or, Counter 390 decrementing to zero, i.e., the occurrence of a signal on counter count equal zero terminal 398. The single transition from Load Input Value State 422 is to Preset Counter State 424, and occurs in response to a transition to Load Input Value State 422. The single transition from Preset Counter State 424 is to Hold State 420, and occurs in response to a transition to Preset Counter State 424.

Referring to FIGS. 16 and 17, the foregoing described apparatus operates in the following manner. Assuming Hold Register 380 has an initial value of zero stored therein, and keyer output signal has a value of zero, the representative value of keyer output signal coupled to hold register input terminal 382 will be continuously loaded into Hold Register 380, and consequently coupled to hold register output terminal 386. Referring to FIG. 17, this corresponds to continuous transitions among Hold State 420, Load Input Value State 422 and Preset Counter State 424. Referring to FIG. 16, when the signal on comparator input terminal 404 is equal to the signal on comparator input terminal 402, a signal is continuously present on comparator output terminal 406, and likewise on hold register load command input terminal 384, resulting in Hold Register 380 being continuously loaded with the value of the signal present on hold register input terminal 382. In a similar fashion, counter load present command terminal 394 has a signal continuously present thereon, resulting in the continuous loading of Counter 390 with the counter present value. In a similar fashion, when the value of keyer output signal is greater than the value held in Hold Register 380, this corresponds to the value of the signal on comparator input terminal 404 being greater than the value of the signal on comparator input terminal 402, which results in the presence of a signal on comparator output terminal 406, resulting in the previously discussed conditions. However, in response to a value of keyer output signal being less than the value held in Hold Register 380, the value present in Hold Register 380 will be continuously held therein, until either the value of keyer output signal becomes less than the value held in Hold Register 380, as previously discussed, or until Counter 390 decrements to zero, i.e., until the counter count equal zero signal appears on terminal 398, which when coupled to hold register load command input terminal 384 and counter load preset command terminal 394 through OR Gate 410, produces the previously discussed transitions among the states of Load Input Value 422 and Preset Counter 424. Consequently it is observed that the apparatus of FIG. 16 operates to extend the width of the signal coupled to hold register input terminal 382, i.e., keyer output signal, by an amount determined by counter preset value.

The foregoing has described the method and apparatus according to the present invention to achieve the widening of a key signal. For the purpose of the present discussion, it is to be understood that the key widener described with respect to FIGS. 15, 16 and 17 will be hereinafter functionally represented as a single block referred to as a key widener, having a key widener input terminal corresponding to key widener input terminal 371 (FIG. 15) and a key widener output terminal corresponding to key widener output terminal 356.

Figure 18:
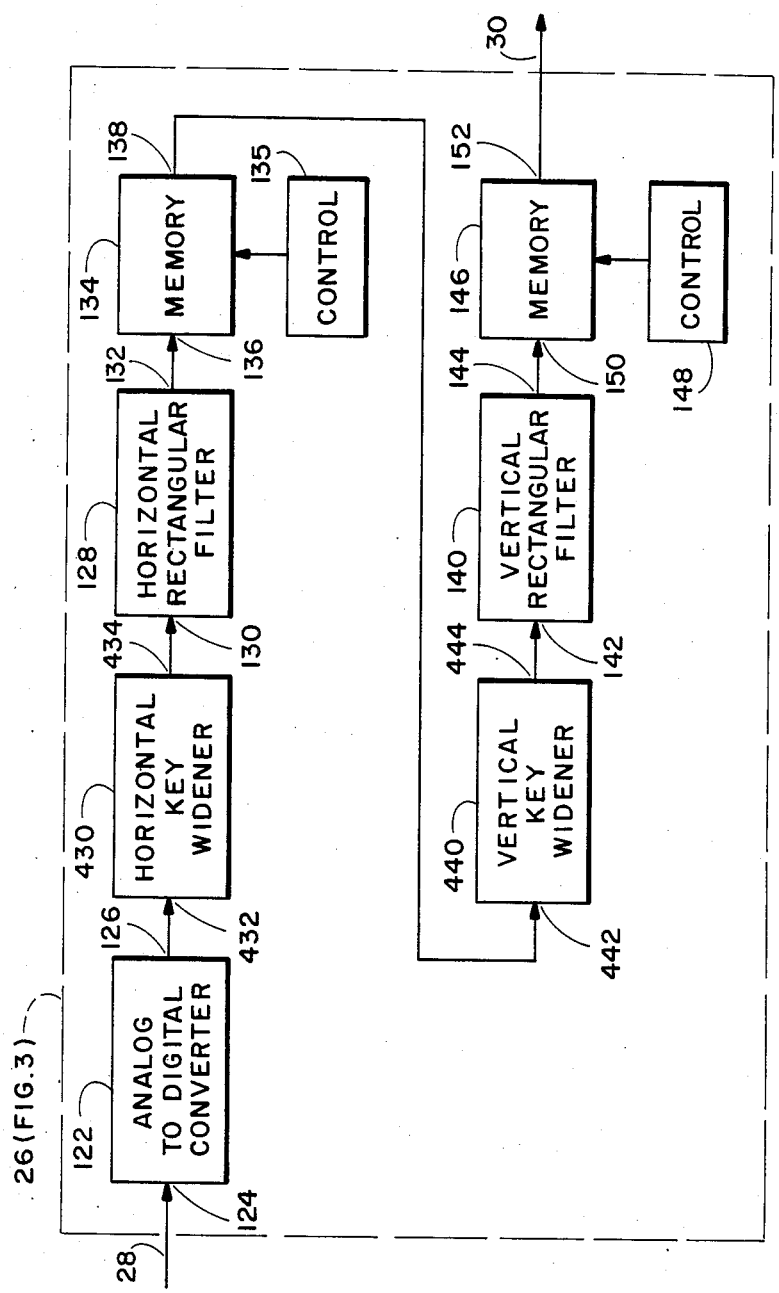
FIG. 18 illustrates a functional block diagram for the filter of FIG. 3 incorporating the functions of key wideners.

FIG. 18 functionally illustrates the integration of the foregoing described key widening apparatus in the previously discussed apparatus for the production of a glow around an inserted object. FIG. 18 is similar to FIG. 5, differing only in the addition of two key wideners, Key Widener 430 and Key Widener 440. Key Widener 430 has associated therewith key widener input terminal 432 and key widener output terminal 434, and Key Widener 440 has associated therewith key widener input terminal 442 and key widener output terminal 444. Referring to FIG. 18, analog-to-digital output terminal 126 from Analog-to-Digital Converter 122, instead of being coupled directly to horizontal rectangular filter input terminal 130 as was previously the configuration discussed with respect to FIG. 5, is instead coupled to key widener input terminal 432 of Key Widener 430. Key widener output terminal 434 of Key Widener 430 is coupled to horizontal rectangular filter input terminal 130. In a similar fashion, memory output terminal 138 from Memory 134, instead of being coupled directly to vertical rectangular filter input terminal 142 of Vertical Rectangular Filter 140, as was previously the configuration discussed with respect to FIG. 5, is instead coupled to key widener input terminal 442 of Key Widener 440. Key widener output terminal 442 of Key Widener 440 is coupled to vertical rectangular filter input terminal 142 of Vertical Rectangular Filter 140. The operation of the apparatus of FIG. 18 is similar to the operation previously discussed with respect to the apparatus of FIG. 5, differing only with respect to the addition of Key Wideners 430 and 440. In particular, as the input signal to Analog-to-Digital converter 122 is keyer output signal, Key Widener 430, responsive to the analog-to-digital output signal, functions to widen the digital representation of the key signal from Keyer 20 (FIG. 1). In this regard, it is recognized that this key widening process is with respect to the horizontal dimension of the key signal. In a similar fashion, Key Widener 440 functions to widen the key signal in the vertical dimension, as read from Memory 134 as previously discussed.

While the foregoing has described a particular implementation of apparatus for the production of a glow around an insert image, there are yet many different ways in which the foregoing may be implemented without departing from the scope of the present invention. Such modification are intended to be included within the spirit of the present invention, as limited only by the scope of the following claims.

We claim:

1. Apparatus for producing a composite video image comprised of a border image around an insert video signal according to a shape defined by an insert image, in a background video image, comprising:

keyer means responsive to the insert image for producing a key signal having a first state responsive to the insert image, and a second state responsive to the absence of the insert image;

first video mixing means responsive to the border image, the insert video signal and the key signal for producing a first video image comprised of the border image with the insert video signal placed therein;

filter means responsive to the key signal for inserting an additional state between the first and the second state of the key signal; and, second video mixing means responsive to the first video image, the background video image and the filter means for producing the composite video image.

2. Apparatus as recited in claim 1 wherein said first video mixing means further comprises means for coupling the insert video signal to the first video image responsive to the first state, and for coupling the border image to the first video image responsive to the second state.

3. Apparatus as recited in claim 1, wherein said second video mixing means further comprises means to couple the first video image to the composite video image in response to the first state, to couple the background video image to the composite video image in response to the second state, and to couple both the first video image and the background image to the composite video image in response to the additional state.

4. Apparatus as recited in claim 3, wherein said second video mixing means further comprises means responsive to the additional state, to couple a first preselected amount of the first video image in combination with a second preselected amount of the background image to the composite video image.

5. Apparatus as recited in claim 1, further comprising state translation means responsive to said filter means for selectively translating states associated with the key signal to selected alternate states.

6. Apparatus as recited in claim 1, wherein said filter means further comprises means for inserting a plurality of additional states between the first and the second state of the key signal.

7. Apparatus as recited in claim 6, further comprising state translation means responsive to said filter means for selectively translating states associated with the key signal to selected alternate states.

8. Apparatus as recited in claim 6, wherein said filter means further comprises means for producing a linear transition between the first and second states of the key signal.

9. Apparatus for producing a composite video image comprised of a border image around an insert video signal according to an insert image, in a background video image, comprising:
keyer means responsive to the insert image for producing a key signal having a first state responsive to the insert image, and a second state responsive to the absence of the insert image;
first video mixing means responsive to the border image, the insert video signal and the key signal for producing a first video image comprised of the border image with the insert video signal placed therein;
filter means responsive to the key signal for producing a continuous transition between the first and second states of the key signal; and,
second video mixing means responsive to the first video image, the background video image and the filter means for coupling the first video image to the composite video image in response to the first state, coupling the background video image to the composite video image in response to the second state, and for coupling both the first video image and the background video images to the composite video image in response to the continuous transition between the first and second states of the key signal.

10. Apparatus as recited in claim 9 wherein the continuous transition between the first and second states of the key signal is a linear transition.

11. Apparatus as recited in claim 9 wherein said second video mixing means further comprises means responsive to the continuous transition between the first and second states of the key signal to couple varying amounts of the first video image and the background video image to the composite video image.

12. A method for producing a video image comprised of a border image around an insert video signal according to an insert image, in a background video image, comprising the steps of:
producing a key signal having a first state responsive to the insert image, and a second state responsive to the absence of the insert image;
producing a first video image responsive to the key signal, the border image and the insert video signal comprised of the border signal with the insert video signal placed therein;
inserting an additional state between the first and the second state of the key signal; and,
producing a composite video image composed of the first video image and the background video image responsive to the states of the key signal.

13. A method for producing a video image as recited in claim 12, further comprising the step of producing a key signal having a plurality of additional states between the first and the second states of the key signal.

14. A method for producing a video image as recited in claim 13, further comprising the step of translating selected states of the key signal to preselected alternate states.

15. Apparatus for producing a composite video image comprised of a glow of a desired color around an insert image in a background video image, comprising:
keyer means responsive to the insert image for producing a key signal having a first state responsive to the insert image, and a second state responsive to the absence of the insert image, and having a time period associated with transitions between the states;
first video mixing means responsive to the desired color, the insert image and the key signal for producing a first video image comprised of the desired color with the insert image placed therein;
a first delay means responsive to the first video image for producing a first delay signal comprised of the first video image delayed by a first preselected amount of time;
a second delay means responsive to the key signal for producing a second delay signal comprised of the key signal delayed by a second preselected amount of time;
filter means responsive to the key signal for increasing the time required for the key signal to change between the states associated therewith;
level translation means responsive to said filter means for selectively translating levels associated with the key signal to selected levels;
non-additive mixing means responsive to the second delay signal and to said level translation means for producing a non-additive mixer output signal according to the larger of the second delay signal and the selected levels of the key signal; and,
second video mixing means responsive to the first video image, the background video image and the non-additive mixing means for producing the composite video image.

16. Apparatus as recited in claim 15 wherein said second video mixing means further comprises means responsive to the first video image, the background video image and said non-additive mixing means for coupling the first video image to the composite video image responsive to the first state, coupling the background video image to the composite video image responsive to the second state, and coupling both the first video image and the background video image to the composite video image during transitions between the states of the key signal.

17. Apparatus as recited in claim 15, wherein said filter means further comprises:
   a first filter means for increasing the time required for the key signal to change between the states associated therewith in a first dimension; and,
   a second filter means responsive to said first filter means for increasing the time required for the key signal to change between the states associated therewith in a second dimension.

18. Apparatus as recited in claim 15, wherein said filter means further comprises:
   a first filter means for producing a first filter signal responsive to the key signal having a first and second state corresponding respectively to the first and second states of the key signal, wherein the amount of time between transitions between the first and second state in the first filter signal is greater than the corresponding time between transitions between the first and second state in the key signal;
   a first memory means responsive to said first filter signal for storing the first filter signal in a first sequence, and subsequently recalling said first filter signal in a second sequence;
   a second filter means responsive to the subsequently recalled first filter signal from said first memory means for producing a second filter signal wherein the amount of time between transitions between states is greater than the corresponding time between transitions between states in the first filter signal;
   a second memory means responsive to said second filter signal for storing the second filter signal in a third sequence, and subsequently recalling said second filter signal in a fourth sequence.

19. Apparatus as recited in claim 18, wherein the second and third sequences are identical, and the first and fourth sequence are identical.

20. Apparatus as recited in claim 18, wherein said first filter means comprise a finite impulse response digital filter.

21. Apparatus as recited in claim 20, wherein said finite impulse response digital filter comprises:
   summing means responsive to a first and second summing means input for producing a summing means output so that the summing means output is equal to the sum of the first and second summing means input, having the key signal coupled to the first summing means input;
   subtracting means responsive to a first and second subtracting means input for producing a subtracting means output so that the subtracting means output is equal to the difference between the first and second subtracting means inputs, having the first summing means output coupled to the first subtracting means input;
   delay means responsive to the key signal for producing a delayed key signal delayed from the key signal by a first preselected amount, the delayed key signal coupled to the second subtracting means input;
   storage means responsive to the subtracting means output for storing the subtracting means output for a second preselected amount of time, coupled to the second summing means input; and,
   product means having a first and second product means input for producing a first filter means output so that the first filter means output is equal to the product of the first and second product means input, having the subtracting means output coupled to the first product means input, and the reciprocal of the first preselected amount of delay associated with said delay means coupled to the second product means input.

22. Apparatus as recited in claim 20, wherein said finite impulse response digital filter comprises:
   summing means responsive to a first and second summing means input for producing a summing means output so that the summing means output is equal to the sum of the first and second summing means input, having the subsequently recalled first filter signal in the second sequence from said first memory means coupled to the first summing means input;
   subtracting means responsive to a first and second subtracting means input for producing a subtracting means output so that the subtracting means output is equal to the difference between the first and second subtracting means inputs, having the first summing means output coupled to the first subtracting means input;
   delay means responsive to the key signal for producing a delayed key signal from the key signal by a first preselected amount, the delayed key signal coupled to the second subtracting means input;
   storage means responsive to the subtracting means output for storing the subtracting means output for a second preselected amount of time, said storage means output coupled to the second summing means input; and,
   product means having a first and second product means input for producing a second filter means output so that the second filter means output is equal to the product of the first and second product means input, having the subtracting means output coupled to the first product means input, and the reciprocal of the first preselected amount of delay associated with said delay means coupled to the product means second input.

23. Apparatus as recited in claim 18, wherein said second filter means comprises a finite impulse response digital filter.

24. Apparatus as recited in claim 18, wherein said first filter means comprises:
   summing means responsive to the key signal for producing a continuous sum of a sequence of sequential values representative of the key signal;
   delay means responsive to the sequence of sequential values representative of the key signal for reproducing the sequence of sequential values subsequent to a preselected delay period;

subtracting means responsive to the continuous sum of sequence of sequential values and the delayed sequence for producing a difference signal responsive to the difference therebetween; and, product means responsive to the difference signal and the reciprocal of the preselected delay period for producing the first filter signal responsive to the product therebetween.

25. Apparatus as recited in claim 18, wherein said second filter means comprises:

summing means responsive to the sequence of sequential values of the subsequentaly recalled first filter signal in the second sequence from the first memory means for producing a continous sum thereof;

delay means responsive to the sequence of sequential values of the subsequently recalled first filter signal in the second sequence from the first memory means for reproducing the sequence subsequent to a preselected delay period;

subtracting means responsive to the continuous sum and the delayed sequence for producing a difference signal responsive to the difference therebetween; and, product means responsive to the difference signal and the reciprocal of the preselected delay period for producing the second filter signal responsive to the product therebetween.

26. Apparatus as recited in claim 15, wherein said filter means further comprises:

a first key widener means responsive to the key signal for producing a first key widener output signal having states corresponding to states in the key signal, and further having a duration in selected states of the first key widener output signal greater than the duration of the corresponding states in the key signal;

a first filter means for producing a first filter signal responsive to the first key widener output signal having states corresponding to the states of the first key widener output signal, wherein the amount of time between transitions between states in the first filter signal is greater than the time between transitions between corresponding states in the first key widener output signal;

a first memory means responsive to the first filter signal for storing the first filter signal in a first sequence, and subsequently recalling from said first memory means said first filter signal in a second sequence;

a second key widener means responsive to the subsequently recalled first filter signal from said first memory means for producing a second key widener output signal having states corresponding to states in the subsequently recalled first filter signal from said first memory means, and further having a duration in selected states of the second key widener output signal greater than the duration of the corresponding states in the subsequently recalled first filter signal from said first memory means;

a second filter means for producing a second filter signal responsive to the second key widener output signal having states corresponding to the states of the second key widener output signal, wherein the amount of time between transitions between states in the second filter signal is greater than the time between transitions between corresponding states in the second key widener output signal; and, a second memory means responsive to said second filter signal for storing the second filter signal in a third sequence, and subsequently recalling said second filter signal in a fourth sequence.

27. Apparatus as recited in claim 26, wherein said first key widener further comprises:

delay means responsive to the key signal for producing a delay means output signal corresponding to the key signal delayed in time by a third preselected amount;

sample and hold means responsive to the key signal for producing a sample and hold output signal so that the sample and hold output signal will be equal to the largest key signal received during a preselected interval of time, provided subsequently received values of key signals do not exceed the value being held by said sample and hold, in which case the sample and hold output signal will assume the value of the subsequently received value of the key signal which exceeded the value previously being held;

non-additive mixing means responsive to the sample and hole output signal and the delay means output signal for producing the first key widener output signal equal to the larger of the sample and hold output signal and the delay means output signal.

28. Apparatus as recited in claim 26, wherein said second key widener further comprises:

delay means responsive to the subsequently recalled first filter signal from said first memory means for producing a delay means output signal corresponding to the subsequently recalled first filter signal from said first memory means delayed in time by a fourth preselected amount;

sample and hold means responsive to the subsequently recalled first filter signal from said first memory means for producing a sample and hold output signal so that the sample and hold output signal will be equal to the largest subsequently recalled first filter signal from said first memory means received during a preselected interval of time, provided subsequently received values of subsequently recalled first filter signal from said first memory means do not exceed the value being held by said sample and hold, in which case the sample and hold output signal will assume the value of the subsequently received value of the subsequently recalled first filter signal from said first memory means which exceeded the value previously being held;

non-additive mixing means responsive to the sample and hold output signal and the delay means output signal for producing the second key widener output signal equal to the larger of the sample and hold output signal and the delay means output signal.

29. Apparatus as recited in claim 27, wherein said sample and hold means further comprises:

holding means responsive to the key signal and a holding means load input, for producing the sample and hold output signal by storing a value of the key signal, and coupling the value of the key signal to the sample and hold output signal;

comparator means responsive to the sample and hold output signal and the key signal for comparing the sample and hold output signal with the key signal, and producing a comparing means output signal in response to the value of the key signal being greater than the sample and hold output signal;

timing means responsive to a timing means start command for producing a time signal upon the expiration of a preselected period of time;

detection means for producing a detection means inidication in response to either the comparing means output signal or the time signal, the detection means indication being coupled to the timing means start command and the holding means load input.

30. Apparatus as recited in claim 28, wherein said sample and hold means further comprises:

holding means responsive to the subsequently recalled first filter signal from said first memory means and a holding means load input, for producing the sample and hold output signal by storing a value of the subsequently recalled first filter signal from said first memory means and coupling the value of the subsequently recalled first filter signal from said first memory means to the sample and hold output signal;

comparator means responsive to the sample and hold output signal and the subsequently recalled first filter signal from said first memory means for comparing the sample and hold output signal with the subsequently recalled first filter signal from said first memory means and producing a comparing means output signal in response to the value of the subsequently recalled first filter signal from said first memory means being greater than the sample and hold output signal;

timing means responsive to a timing means start command for producing a time signal upon the expiration of a preselected period of time;

detection means for producing a detection means indication in response to either the comparing means output signal or the time signal, the detection means indication being coupled to the timing means start command and the holding means load input.

* * * * *